United States Patent
Nguyen et al.

(10) Patent No.: US 12,137,388 B2
(45) Date of Patent: Nov. 5, 2024

(54) COVERAGE EXTENSION FOR DEVICE LOCALIZATION THROUGH COLLABORATIVE RANGING

(71) Applicant: Samsung Electronics Co., Ltd., Suwon-si (KR)

(72) Inventors: Hoang Viet Nguyen, Plano, TX (US); Yuming Zhu, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 17/519,385

(22) Filed: Nov. 4, 2021

(65) Prior Publication Data

US 2022/0201434 A1 Jun. 23, 2022

Related U.S. Application Data

(60) Provisional application No. 63/127,505, filed on Dec. 18, 2020.

(51) Int. Cl.
*H04W 4/029* (2018.01)
*G01S 5/04* (2006.01)
(Continued)

(52) U.S. Cl.
CPC ............ *H04W 4/029* (2018.02); *G01S 5/04* (2013.01); *G06T 11/00* (2013.01); *H04W 4/20* (2013.01)

(58) Field of Classification Search
CPC ....... H04W 4/20; H04W 4/029; H04W 4/023; H04W 4/80; G01S 5/0072; G01S 5/0289;
(Continued)

(56) References Cited

U.S. PATENT DOCUMENTS 9,170,318 B1    10/2015   Bozarth et al.
9,684,765 B2    6/2017    Vatenos
(Continued)

FOREIGN PATENT DOCUMENTS

KR   10-2020-0092481 A   8/2020
WO      2020214708 A1    10/2020
WO      2020219692 A1    10/2020

OTHER PUBLICATIONS

Extended European Search Report dated Aug. 30, 2023 regarding Application No. 21907079.4, 11 pages.
(Continued)

*Primary Examiner* — Congvan Tran

(57) ABSTRACT

A method for localizing a target device (TD) by a user device (UD) includes determining whether the TD is within a range and within a field-of-view (FoV) of the UD based on a UWB channel between the TD and the UD. In response to a determination that the TD is outside the range and not within the FoV, the method includes identifying a first electronic device. The method also includes transmitting, to the first electronic device, a request for localizing the TD using an out-of-band channel. The method further includes receiving, from the first electronic device, location information of the TD on the out-of-band channel. The location information represents a candidate location of the TD in a coordinate system of the first or a second electronic device. Additionally, the method includes identifying a TD location with respect to a coordinate system of the UD based on the candidate location.

20 Claims, 23 Drawing Sheets

(51) Int. Cl.
 *G06T 11/00* (2006.01)
 *H04W 4/20* (2018.01)
(58) Field of Classification Search
 CPC ........ G01S 5/04; G01S 5/0278; G01S 5/0218;
 G06T 11/00
 See application file for complete search history.

(56) References Cited

U.S. PATENT DOCUMENTS

| | | | |
|---|---|---|---|
| 10,094,910 | B2 | 10/2018 | Hamilton |
| 10,422,851 | B2 | 9/2019 | Erad et al. |
| 10,602,556 | B2 | 3/2020 | Foster et al. |
| 10,794,983 | B1 | 10/2020 | Chandail et al. |
| 2014/0206389 | A1 | 7/2014 | Aldana et al. |
| 2017/0221351 | A1 | 8/2017 | Watzka et al. |
| 2018/0165437 | A1* | 6/2018 | Shim ................ G06V 10/17 |
| 2019/0094140 | A1* | 3/2019 | Han ................ G01N 21/47 |
| 2019/0113966 | A1* | 4/2019 | Connellan ................ G01S 5/16 |
| 2020/0280853 | A1 | 9/2020 | Osborn et al. |
| 2020/0324713 | A1* | 10/2020 | Lee ................ B60R 11/04 |
| 2020/0363524 | A1* | 11/2020 | Yoon ................ H04W 12/069 |
| 2020/0367016 | A1 | 11/2020 | Jung et al. |
| 2020/0383157 | A1 | 12/2020 | Lee et al. |

OTHER PUBLICATIONS

Notification of Transmittal of the International Search Report and the Written Opinion of the International Searching Authority, or the Declaration dated Mar. 21, 2022 in connection with International Patent Application No. PCT/KR2021/019031, 8 pages.

European Patent Office, Communication pursuant to Article 94(3) EPC issued Mar. 1, 2024 regarding Application No. 21907079.4, 9 pages.

* cited by examiner

| Source \ Destination | ED_1 | ED_2 | ED_3 | ... | ED_n |
|---|---|---|---|---|---|
| ED_1 |  | No Result | X: 13<br>Y: 13<br>Z: 13 | ... | No Result |
| ED_2 | No Result |  | X: 23<br>Y: 23<br>Z: 23 | ... | X: 2n<br>Y: 2n<br>Z: 2n |
| ED_3 | No Result | X: 32<br>Y: 32<br>Z: 32 |  | ... | X: 3n<br>Y: 3n<br>Z: 3n |
| ... | ... | ... | ... |  | ... |
| ED_n | X: n1<br>Y: n1<br>Z: n1 | X: n2<br>Y: n2<br>Z: n2 | No Result | ... |  |

| Source \ Destination | ED_1 | ED_2 | ED_3 | ... | ED_n | Target Device |
|---|---|---|---|---|---|---|
| ED_1 |  | No Result | X: 13<br>Y: 13<br>Z: 13 | ... | No Result | No Result |
| ED_2 | No Result |  | X: 23<br>Y: 23<br>Z: 23 | ... | X: 2n<br>Y: 2n<br>Z: 2n | X: 2T<br>Y: 2T<br>Z: 2T |
| ED_3 | No Result | X: 32<br>Y: 32<br>Z: 32 |  | ... | X: 3n<br>Y: 3n<br>Z: 3n | X: 3T<br>Y: 3T<br>Z: 3T |
| ... | ... | ... | ... |  | ... | ... |
| ED_n | X: n1<br>Y: n1<br>Z: n1 | X: n2<br>Y: n2<br>Z: n2 | No Result | ... |  | X: nT<br>Y: nT<br>Z: nT |

COVERAGE EXTENSION FOR DEVICE LOCALIZATION THROUGH COLLABORATIVE RANGING

CROSS-REFERENCE TO RELATED APPLICATION AND CLAIM OF PRIORITY

This application claims priority under 35 U.S.C. § 119(e) to U.S. Provisional Patent Application No. 63/127,505 filed on Dec. 18, 2020. The above-identified provisional patent application is hereby incorporated by reference in its entirety.

TECHNICAL FIELD

This disclosure relates generally to localizing an electronic device. More specifically, this disclosure relates to coverage extension for device localization through collaborative ranging.

BACKGROUND

The use of mobile computing technology has greatly expanded largely due to usability, convenience, computing power, and the like. One result of the recent technological development is that electronic devices are becoming more compact, while the number of functions and features that a given device can perform is increasing, such as localizing a device within an environment. Localizing a device within an environment can be based on device-to-device localization. For example, in wireless communication applications, various wireless electronic devices can be located within a given environment by another electronic device. Using various wireless signals an electronic device can locate another electronic device by transmitting and receiving signals with the other electronic device. Based on the exchange of signals, the electronic device can determine an angle of arrival (AoA) of the received signals and a range (distance) between the devices. Using the AoA and range the electronic device locate the other electronic relative to its current location. However various environmental factors can cause the electronic device to incorrectly determine the location of the other electronic device or prevent the electronic device from receiving signals from the other electronic device that are used for determining the location of the other electronic device. Environmental factors can include physical obstacles (including walls, furniture, appliances, and the like). Environmental factors can also be based on the distance between the two devices. For example if the distance between the two devices is too large one or both device may not receive signals transmitted from the other electronic device.

SUMMARY

This disclosure provides coverage extension for device localization through collaborative ranging.

In a first embodiment, a method for localizing a target device by a user device is provided. The method includes determining whether the target device is within a range and within a field-of-view (FoV) of the user device based on a UWB channel between the target device and the user device. In response to a determination that the target device is outside the range and not within the FoV of the user device, the method includes identifying a first electronic device. The method includes transmitting, to the first electronic device, a request for localizing the target device using an out-of-band channel, wherein the out-of-band channel is different from the UWB channel. The method includes receiving, from the first electronic device, location information of the target device on the out-of-band channel, the location information representing a candidate location of the target device in a coordinate system of the first electronic device or a second electronic device. The method includes identifying a target device location with respect to a coordinate system of the user device based on the candidate location of the target device.

In another embodiment, a user device is provided. The electronic device includes a transceiver and a processor. The processor is configured to determine whether a target device is within a range and within a FoV of the user device based on a UWB channel between the target device and the user device. in response to a determination that the target device is outside the range and not within the FoV of the user device, The processor is configured to identify a first electronic device. The processor is also configured to transmit, to the first electronic device, a request for localizing the target device using an out-of-band channel, wherein the out-of-band channel is different from the UWB channel. The processor is further configured to receive, from the first electronic device, location information of the target device on the out-of-band channel, the location information representing a candidate location of the target device in a coordinate system of the first electronic device or a second electronic device. Additionally, the processor is configured to identify a target device location with respect to a coordinate system of the user device based on the candidate location of the target device.

In yet another embodiment a non-transitory computer readable medium embodying a computer program is provided. The computer program comprising computer readable program code that, when executed by a processor of an electronic device, causes the processor to: determine whether a target device is within a range and within a FoV of the user device based on a UWB channel between the target device and the user device; in response to a determination that the target device is outside the range and not within the FoV of the user device, identify a first electronic device; transmit, to the first electronic device, a request for localizing the target device using an out-of-band channel, wherein the out-of-band channel is different from the UWB channel; receive, from the first electronic device, location information of the target device on the out-of-band channel, the location information representing a candidate location of the target device in a coordinate system of the first electronic device or a second electronic device; and identify a target device location with respect to a coordinate system of the user device based on the candidate location of the target device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9B illustrates an example table of environmental device locations according to embodiments of the present disclosure;

FIG. 9C illustrates an example table of a target device lookup map based on the example table of the environmental device locations of FIG. 9B according to embodiments of the present disclosure;

DETAILED DESCRIPTION

Figure 1:
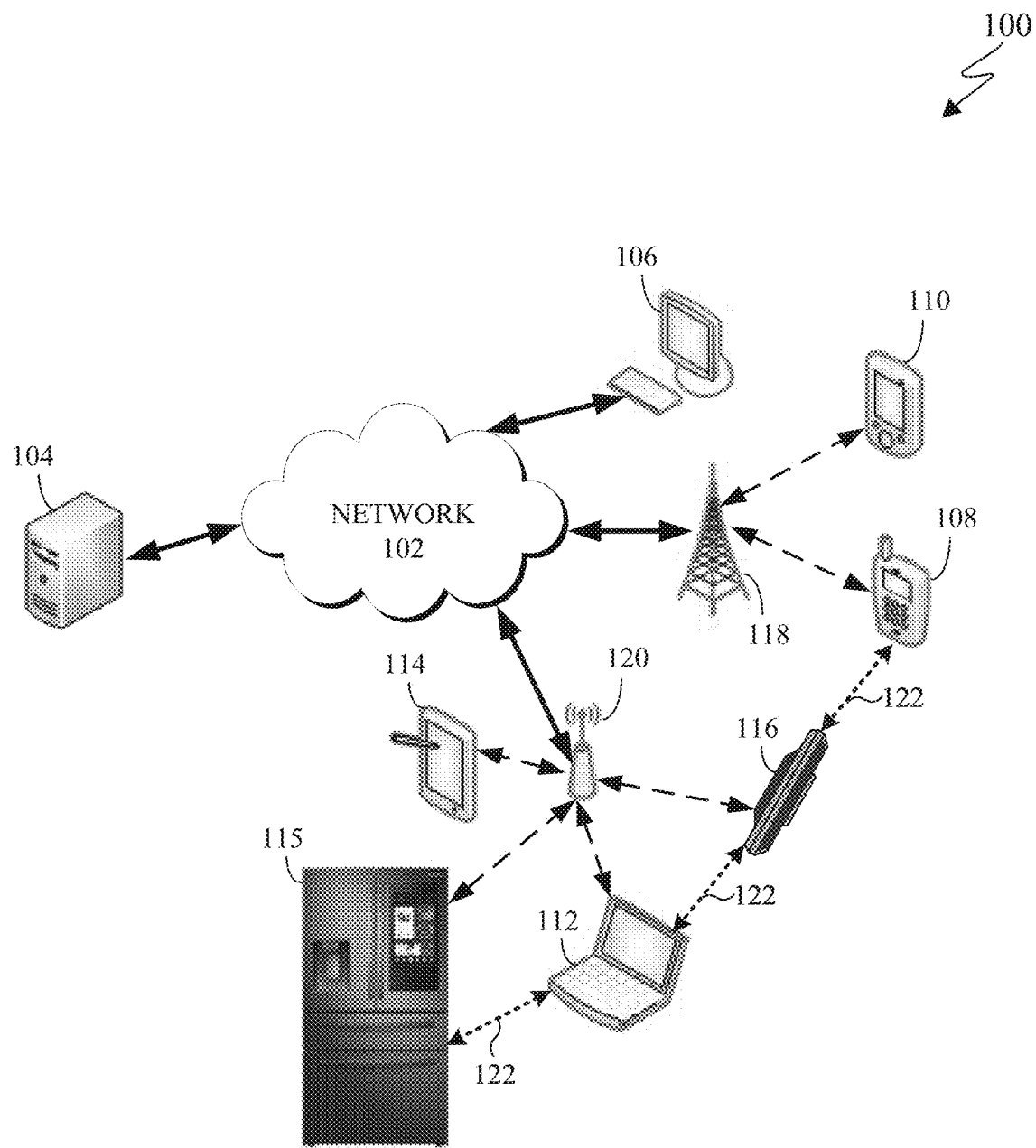
FIG. 1 illustrates an example communication system according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Wireless signals can be used for localization of an electronic device. Localization is the ability to determine a location of another electronic device. Wireless signals using Global Positioning System (GPS) can be used for outdoor localization. However, GPS may not provide accurate results for indoor settings. Examples of indoor localization can be based on Wi-Fi signals, BLUETOOTH signals, Ultra-Wideband (UWB) signals, and the like.

In certain embodiments, an electronic device can include a transmitter and receiver (or a transceiver) and one or more target devices can include a transmitter and receiver (or a transceiver). The receiver (or transceiver) can be can ultra-wideband (UWB) receiver (or UWB transceiver). Similarly, the transmitter (or transceiver) can be a UWB transmitter (or UWB transceiver). The electronic device can measure angle of arrival (AoA) of a UWB signal transmitted by the target device. The electronic device can also measure the distance between the two devices based on UWB signals.

UWB signals can provide centimeter level ranging. For example, if the target device is within line of sight (LoS) of the electronic device, the electronic device can determine the range (distance) between the two devices with an accuracy that is within ten centimeters. Alternatively if the target device is not within a LoS of the electronic device, the electronic device can determine the range between the two devices with an accuracy that is within fifty centimeters. Additionally, if the target device is within LoS of the electronic device, the electronic device can determine the AoA between the two devices with an accuracy that is within three degrees.

Device localization is the ability of a user device (such as an electronic device or the mobile device 108 that a user is using), identifying the location of another electronic device such as a target device. In certain embodiments, the target device and user device are equipped with an antenna module (such as a UWB antenna module) and one or more antenna elements, thus the user device can find the position of the target device through a UWB ranging session.

An electronic device and a target device should be within a ranging distance to have a strong enough UWB signal for generating reliable UWB ranging information. However, if the devices are beyond the ranging distance (such as when the devices are far away) or have a weak signal (such as when an obstacle is blocking the signal between the devices) the UWB ranging information can be inaccurate or non-existent.

Embodiments of the present disclosure take into consideration that there are cases when the user device cannot find the target device's location. In one scenario, the target device is outside of the UWB effective range of the user device, as such the UWB signal between the two devices is too weak to return reliable location measurements (such as range and angle-of-arrival (AoA) measurements). In another scenario, there may be obstacle(s) or any other type of blockage(s) blocking UWB signal between user device and target device. As such when there is no UWB measurement between target device and user device, then no location measurements can be obtained.

Embodiments of the present disclosure improve the working range of device-to-device localization applications (such as for finding lost items and augmented reality application) by leveraging the available smart devices in an indoor environment. In addition, even when there is no Line-of-sight between user device and target device (such as when the lost items hidden behind walls), the collaboration from multiple indoor devices can still provide location information to the user device instead of no results as in direct UWB ranging case.

To improve the opportunity for the user device to find the location of the target device, embodiments of the present disclosure describe using other existing devices within the same environment as the user device and target device in a collaborative ranging effort (these devices are called Environment Devices (ED)). Some examples of these environment devices are smart plugs, doorknobs, smart lights, smart appliances, and the like. The electronic device participating in this collaborative device localization application is equipped with a measuring transceiver 370 (described below) such as UWB antenna module with one or more antenna elements. Each set of devices (including user device, target device, and environmental devices) are thus able to perform ranging session to estimate the distance between them and the AoA of one device to the other.

Embodiments of the present disclosure describe various approached for localizing a target device. A decentralized approach, a centralized approach, a hybrid approach and a collaborative localization approach describe how the environmental devices can locate a target device and how the location of the target device is forward the user device. These approaches also describe how the results, from one or more of the environmental devices, are combined to identify a location of the target device.

Accordingly, embodiments of the present disclosure provide methods and devices to extend the coverage range of device-to-device localization through collaborative ranching. In certain embodiments, by leveraging existing devices within an environment (referred to as environmental devices such as smart plugs, smart lights, appliances, computers, televisions, and the like), an electronic device (also referred to as a user device or inquiring device) can find the location of a target device even when the target device is out of the ranging distance or blocked by an obstacle from the electronic device.

Embodiments of the present disclosure describe how the user device triggers a target device look up process. Embodiments of the present disclosure also describe how environmental devices can be used to find the target device and forward their findings back to the user device. Embodiments of the present disclosure further describe how an electronic device can combine results that are received from multiple environmental devices to identify the location of the target device within the environment. Additionally, embodiments of the present disclosure describe how a single user device, or another electronic device can perform the localization of the target device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display, a TV, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102.

Each of the client devices 106-116 represent any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, a refrigerator 115, and a television 116. However, any other or additional client devices could be used in the communication system 100, such as a wearable device or an appliance. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, the refrigerator 115, and the television 116 communicate via one or more wireless access points 120, such as IEEE 802.11 wireless access points. Note that these are for illustration only and that each of the client devices 106-116 could communicate directly with the network 102 or indirectly with the network 102 via any suitable intermediate device(s) or network(s). In certain embodiments, any of the client devices 106-116 transmit information securely and efficiently to another device, such as, for example, the server 104.

In certain embodiments, any of the client devices 106-116 can emit and receive UWB signals 122 via a measuring transceiver. As illustrated, the television 116 and the mobile device 108 communicate via UWB signals 122. Similarly, the television 116 and the laptop computer 112 communicate via UWB signals 122. Additionally, the refrigerator 115 and the laptop computer 112 communicate via UWB signals 122. For example, the television 116 can transmit a UWB signal that is time stamped to the mobile device 108 (or the laptop computer 112). In response, the mobile device 108 (or the laptop computer 112) transmits a time stamped UWB signal back to the television 116. The television 116 can then generate location information, indicating a location of the mobile device 108 relative to itself (the television 116). The television 116 can then generate location information, indicating a location of the laptop computer 112 relative to itself (the television 116). The location information can include distance between the television 116 and the mobile device 108 (or the laptop computer 112). Additionally, the location information can indicate angle features, such AoA measurements of the received UWB signals of the mobile device 108 (or the laptop computer 112). Based on the AoA measurements, the television 116 can determine an angle (in azimuth, elevation, or both) that the mobile device 108 (or the laptop computer 112) is, relative to itself (the television 116).

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
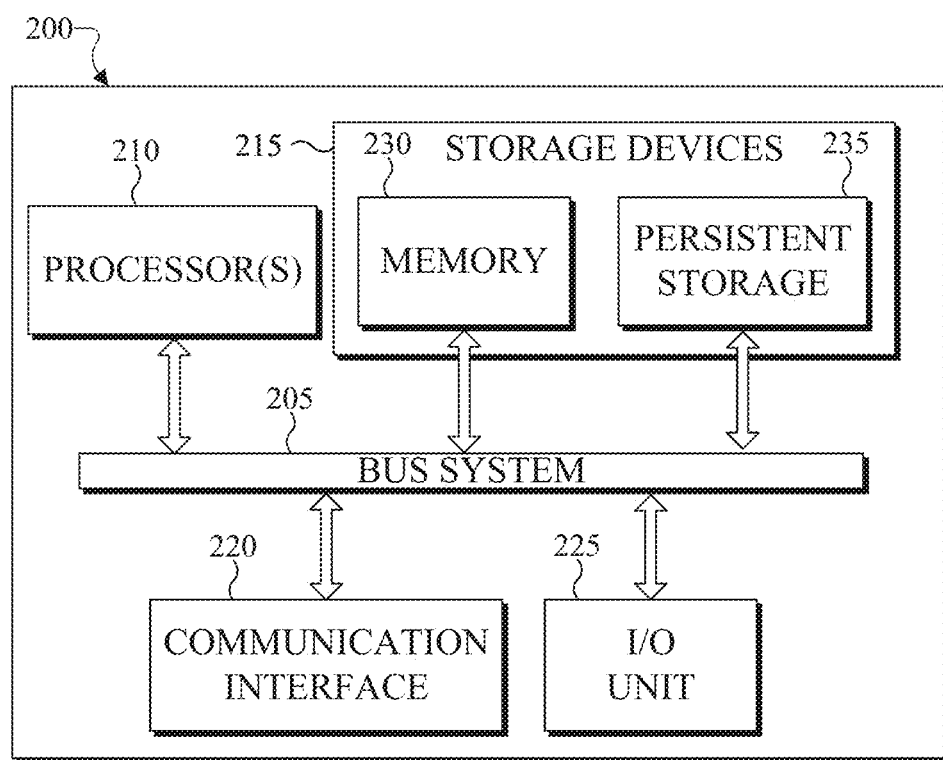
FIGS. 2 and 3 illustrate example electronic devices according to embodiments of the present disclosure.
Figure 3:
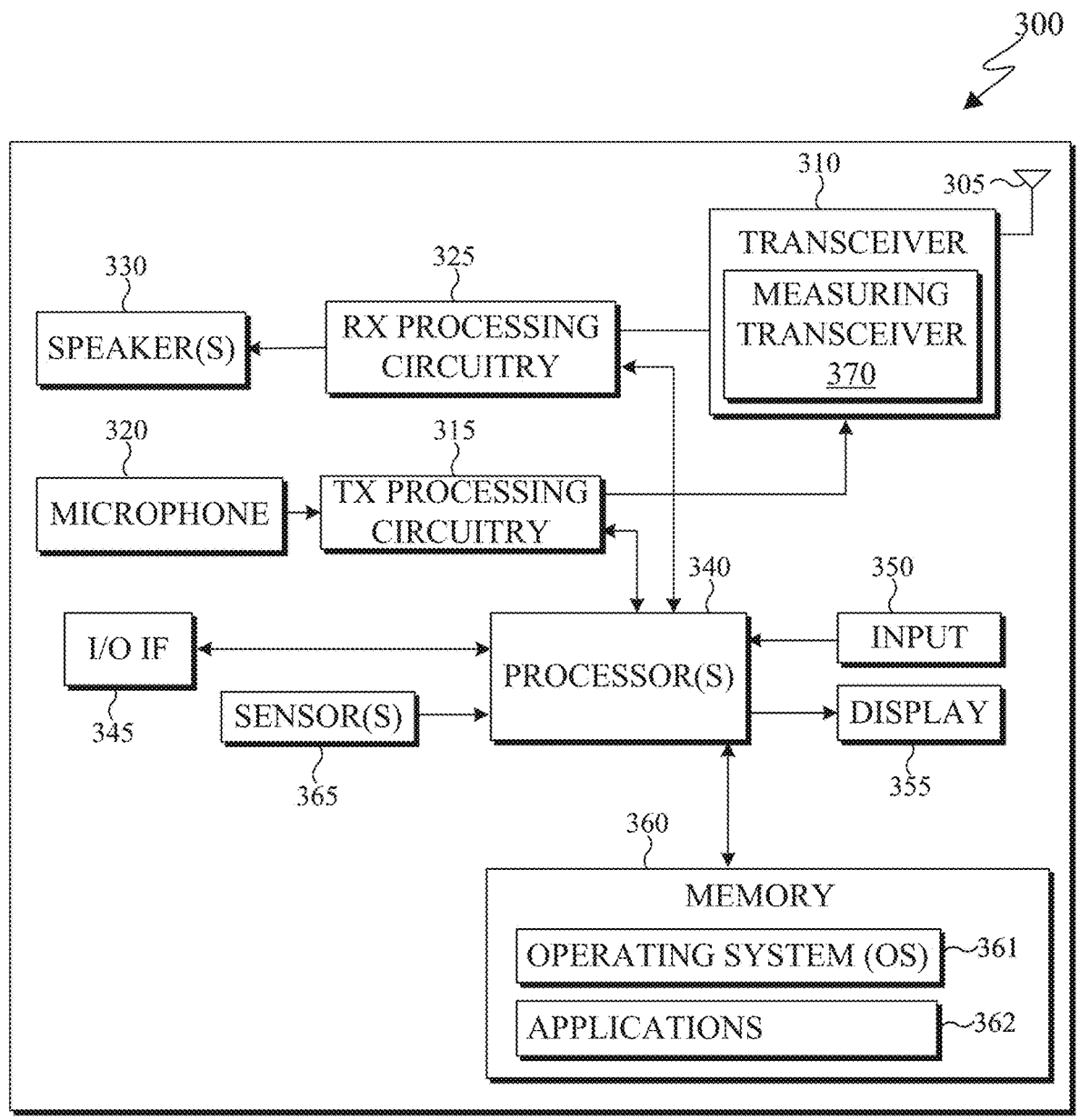

FIGS. 2 and 3 illustrate example electronic devices in accordance with an embodiment of this disclosure. In particular, FIG. 2 illustrates an example electronic device 200, and the electronic device 200 could represent the server 104 in FIG. 1. The electronic device 200 can represent one or more local servers, remote servers, clustered computers, and components that act as a single pool of seamless resources, a cloud-based server, and the like. In certain embodiments, the electronic device 200 can represent an access point, such as the access points 120. The electronic device can also represent a centralized device (also referred to as a hub or centralized hub) that coordinates the localization within the environment. The electronic device 200 can be accessed by one or more of the client devices 106-114 of FIG. 1 or another server.

As shown in FIG. 2, the electronic device 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can generate a localization model based on measurement signals from various anchors within the environment.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for localizing an electronic device within an environment. The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit a localization map to another device such as one of the client devices 106-114.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the electronic device 200 occur via a network connection.

It is noted that the same or similar structure of the electronic device 200 of FIG. 2 could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, a desktop computer (similar to the desktop computer 106 of FIG. 1), a portable electronic device (similar to the mobile device 108, the PDA 110, the laptop computer 112, or the tablet computer 114 of FIG. 1), and the like. In certain embodiments, one or more of the client devices 106-114 of FIG. 1 can include the same or similar configuration as the electronic device 300.

As shown in FIG. 3, the electronic device 300 includes antenna(s) 305, a transceiver(s) 310, transmit (TX) processing circuitry 315, a microphone 320, and receive (RX) processing circuitry 325. The transceiver(s) 310 can include, for example, a RF transceiver, a BLUETOOTH transceiver, a WI-FI transceiver, a ZIGBEE transceiver, an infrared transceiver, a UWB transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The transceiver(s) 310 can include an antenna array including numerous antennas, such as the antenna(s) 305. The antennas of the antenna array can include a radiating element composed of a conductive material or a conductive pattern formed in or on a substrate. As illustrated the transceiver(s) 310 also includes a measuring transceiver 370. The measuring transceiver 370 is discussed in greater detail below.

The transceiver(s) 310 transmit and receive a signal or power to or from the electronic device 300. For example, the transceiver(s) 310 receives from the antenna 305, an incoming signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The transceiver(s) 310 down-converts the incoming signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The transceiver(s) 310 receives the outgoing processed baseband or intermediate frequency signal from the TX processing circuitry 315 and up-converts the baseband or intermediate frequency signal to a signal that is transmitted via the antenna(s) 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the transceiver(s) 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry. In certain embodiments, the processor 340 includes a neural network.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include localization services, a camera application, a video phone call application, an email client, a social media client, a SMS messaging client, a virtual assistant, and the like.

The processor 340 is also coupled to the I/O interface 345 that provides the electronic device 300 with the ability to connect to other devices, such as client devices 106-116. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein. Any of these sensor(s) 365 may be located within the electronic device 300 or within a secondary device operably connected to the electronic device 300.

In this embodiment, one of the one or more transceivers in the transceiver 310 is the measuring transceiver 370. The measuring transceiver 370 is configured to transmit and receive signals for detecting and ranging purposes. The measuring transceiver 370 can transmit and receive signals for measuring range and angle of an external object relative to the electronic device 300. The measuring transceiver 370 may be any type of transceiver including, but not limited to a Wi-Fi transceiver, for example, an 802.11ay transceiver, a UWB transceiver, and the like. In certain embodiments, the measuring transceiver 370 includes a sensor. For example, the measuring transceiver 370 can operate both measuring and communication signals concurrently. The measuring transceiver 370 includes one or more antenna arrays, or antenna pairs, that each includes a transmitter (or transmitter antenna) and a receiver (or receiver antenna). The measuring transceiver 370 can transmit signals at a various frequencies, such as in UWB. The measuring transceiver 370 can receive the signals from an external electronic device.

The transmitter, of the measuring transceiver 370, can transmit UWB signals. The receiver, of the measuring transceiver, can receive UWB signals from other electronic devices. The processor 340 can analyze the time difference, based on the time stamps of transmitted and received signals, to measure the distance of the target objects from the electronic device 300. Based on the time differences, the processor 340 can generate location information, indicating a distance that the external electronic device is from the electronic device 300. In certain embodiments, the measuring transceiver 370 is a sensor that can detect range and AoA of another electronic device. For example, the measuring transceiver 370 can identify changes in azimuth and/or elevation of the other electronic device relative to the measuring transceiver 370.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
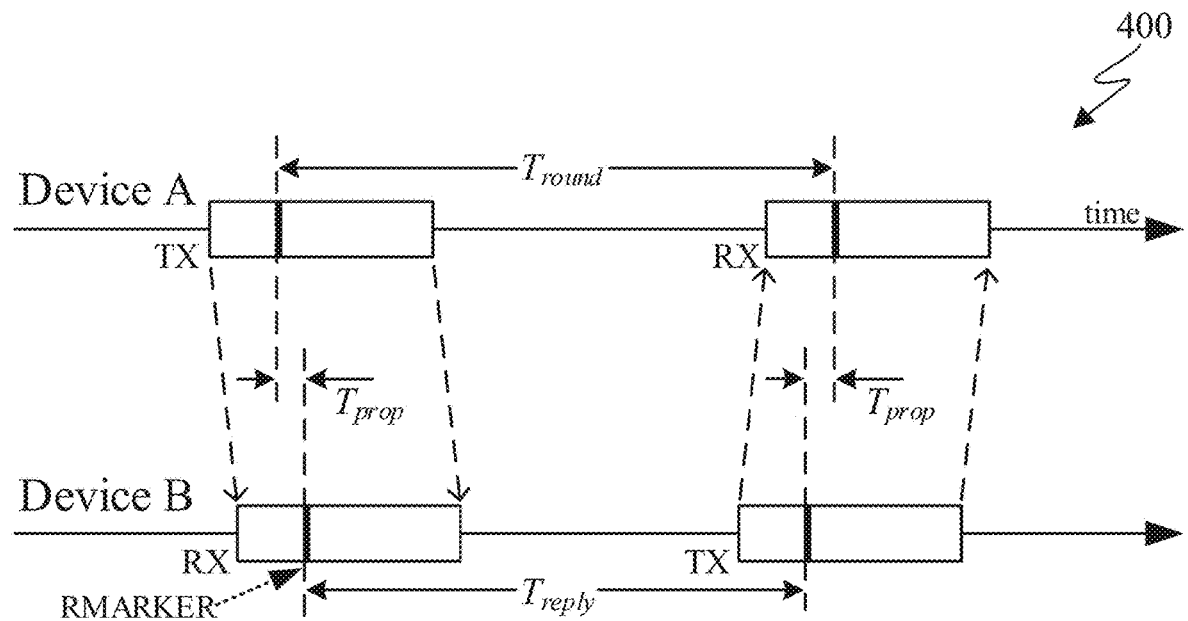
FIGS. 4A and 4B illustrate two way ranging according to embodiments of the present disclosure.
Figure 4B:
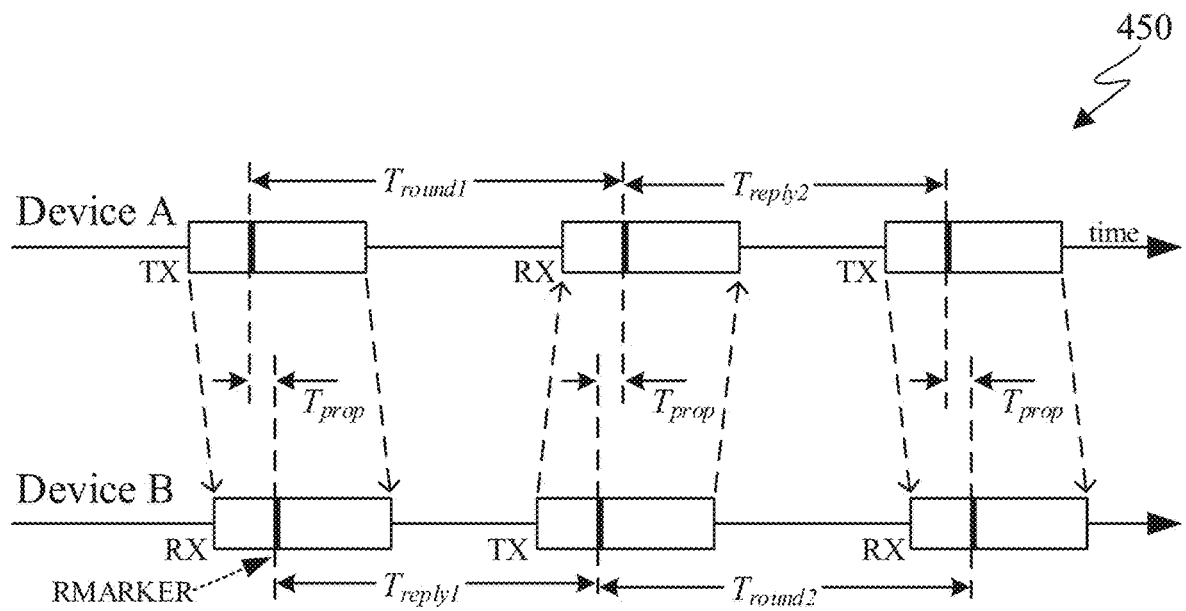

FIGS. 4A and 4B illustrate two way ranging (TWR) according to embodiments of the present disclosure. In particular, FIG. 4A illustrates an embodiment 400 of single sided two way ranging (SS-TWR) according to embodiments of the present disclosure. FIG. 4B illustrates an embodiment 450 of double sided two way ranging (DS-TWR) according to embodiments of the present disclosure. That is, the TWR of FIGS. 4A and 4B describe how an electronic device (such as a first electronic device, similar to the television 116 of FIG. 1) calculates a distance between itself and another electronic device. Any one of the client device 106-116 of FIG. 1 can include internal components that can perform single sided two way ranging, double sided two way ranging, or both single sided and double sided two way ranging.

Embodiments of the present disclosure provide systems and methods for using wireless technology to determine a location (such as distance or range feature) of another device relative to a primary or first device. One localization technique is trilateration. Trilateration is a method of determining the location of a device (called tag or target device) in space, using the ranges (distances) measurements between the tag and multiple spatially separated anchors with known locations. The ranges between the tag and the anchors can be determined using two way ranging (TWR) between the tag and each of the anchors. Based on the determined ranges between the tag and the multiple anchors the location of the tag is determined.

Range features are the range measurements between two devices equipped with a certain signaling capability such as by transmitting and receiving signals in UWB. Using UWB, the round-trip time of a signal sent between two devices are measured with the precision in the order of nanoseconds, then the range values between the two devices can be determined, since the speed is known. High ranging accuracy is obtained by using high precision in the time measurements. For example, ranging error can be less than 10 cm when the two devices are within line-of-sight. Other wireless signals can be used to obtain range values. For example, an electronic device can determine distance using received signal strength indication (RSSI) in Wi-Fi. In this case, the range values can be determined through a mapping from a measurable quantity, such as signal strength. Embodiments of the present disclosure take into consideration that while such mapping (such as by using signal strength) can be a reasonable indicator of distance between devices (signal strength is smaller when the distance between two devices is greater than 10 meters than when this distance is smaller than 10 meters), it is difficult to have an exact mapping or distance (such as the ability to identify a distance between the two devices when the measured signal strength is 10 dB) because the signal strength is highly dependent on other aspects, such as hardware difference, multipaths in the environment, and the like.

The embodiment 400 of FIG. 4A and the embodiment 450 of FIG. 4B illustrate two devices (device A and device B) exchanging signals using UWB for determining the distance between the devices. It is noted that device A and device B can be any of the client devices 106-116 of FIG. 1 and include any internal components of the electronic device 200 of FIG. 2 or the electronic device 301 of FIG. 3. For example, device A can be a television 116 and device B can be the mobile device 108, as illustrated in FIG. 1. In certain embodiments, device A and device B (of FIGS. 4A and 4B) can include a transceiver, such as the measuring transceiver 270 of FIG. 2, for transmitting and receiving messages.

As illustrated in the embodiment 400 of FIG. 4A, two devices, that of device A and device B, perform SS-TWR. In certain embodiments, SS-TWR is performed to measure the round trip delay of a single message from the initiator to the responder and a response sent back to the initiator. In particular, the device A initiates the exchange of signals, and the device B responds to complete the exchange to perform a SS-TWR. Each device precisely timestamps the transmission and reception times of the message frames. Based on the timestamps, device A, device B, or both devices A and B can calculate times $T_{round}$ and $T_{reply}$ and then by using Equation (1), below, determine the resulting time-of-flight.

$$\hat{T}_{prop} = \frac{1}{2}(T_{round} - T_{reply}) \quad (1)$$

As illustrated in the embodiment 450 of FIG. 4B, two devices, that of device A and device B, perform DS-TWR. In certain embodiments, DS-TWR reduces the estimation error induced by clock drifts from long response delays of the SS-TWR. For example, the embodiment 450 of FIG. 4B, illustrates three messages are used for reducing the estimation error induced by clock drift from long response delays. Device A is the initiator to initialize the first round trip measurement, while device B as the responder, both responds to complete the first round trip measurement, and initializes the second round trip measurement. Each device precisely timestamps the transmission and reception times of the messages. Based on the time stamps a resultant time-of-flight estimate, $T_{prop}$, can be identified, such as by using Equation (2), below:

$$\hat{T}_{prop} = \frac{(T_{round1} \times T_{round2} - T_{reply1} \times T_{reply2})}{(T_{round1} + T_{round2} + T_{reply1} + T_{reply2})} \quad (2)$$

A range (such as a distance) between the device A and device B, can be identified using the resultant time-of-flight estimate from SS-TWR (of the embodiment 400 of FIG. 4A) or DS-TWR (of the embodiment 440 of FIG. 4B). Equation (3), below, describes identifying the distance between the device A and device B. In Equation (3), R is the range estimate, $\hat{T}_{prop}$ is the value identified in Equation (1) or Equation (2), and c is the speed of light.

$$R = T_{prop} \times C \quad (3)$$

Figure 5A:
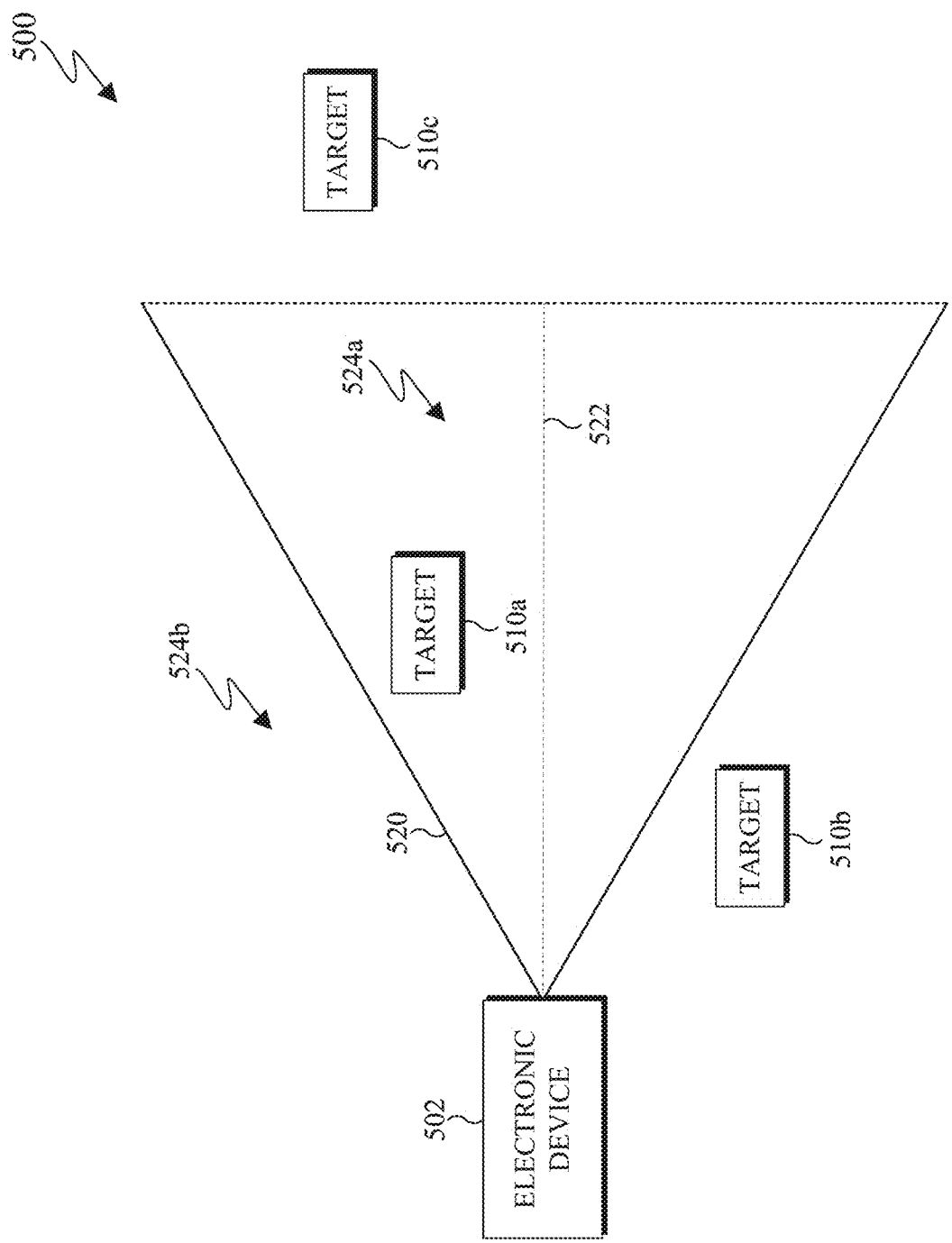
FIGS. 5A, 5B, and 5C illustrate example diagrams of a determination of whether a target device is within a field of view (FoV) of an electronic device according to embodiments of the present disclosure.
Figure 5B:
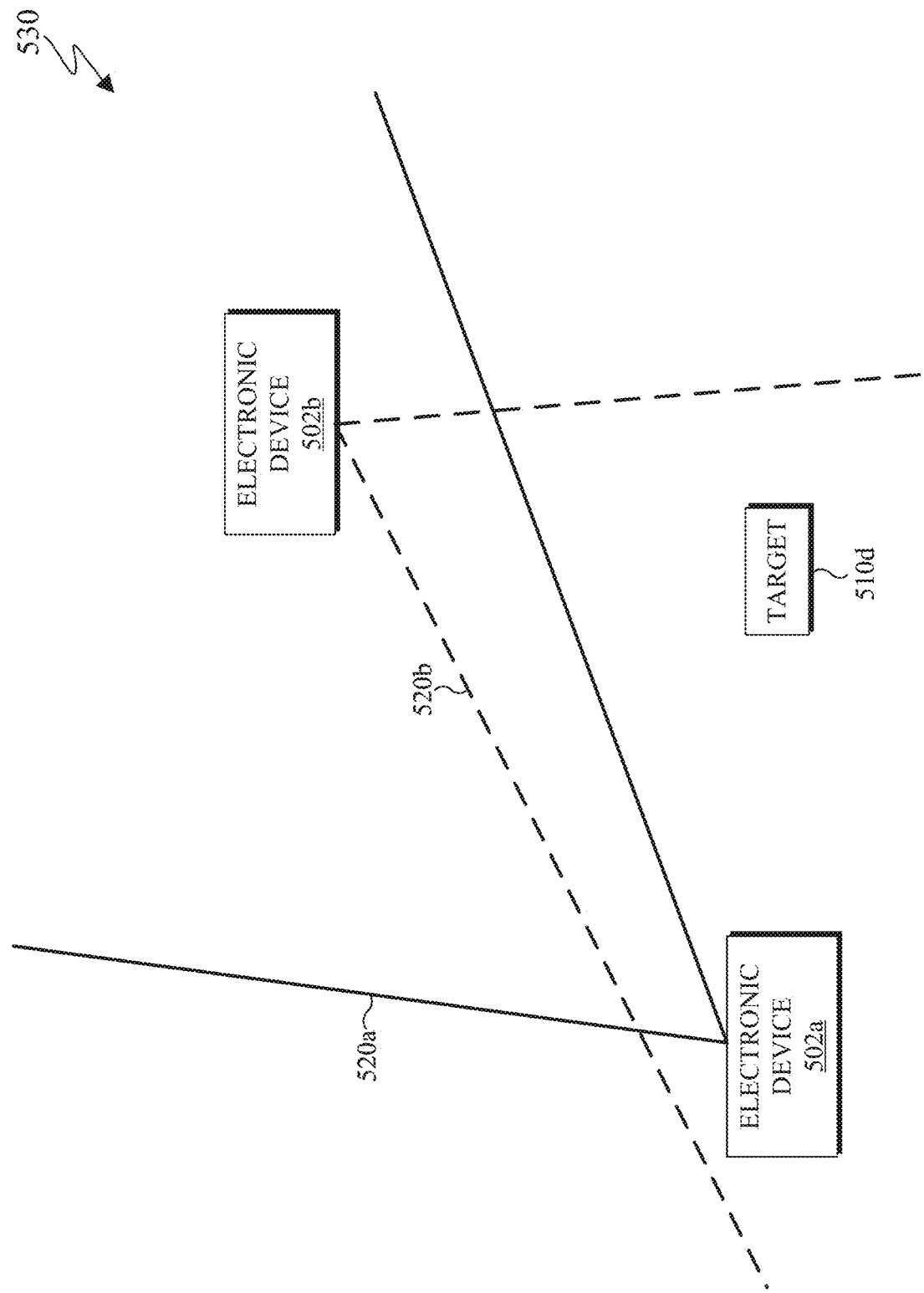
Figure 5C:
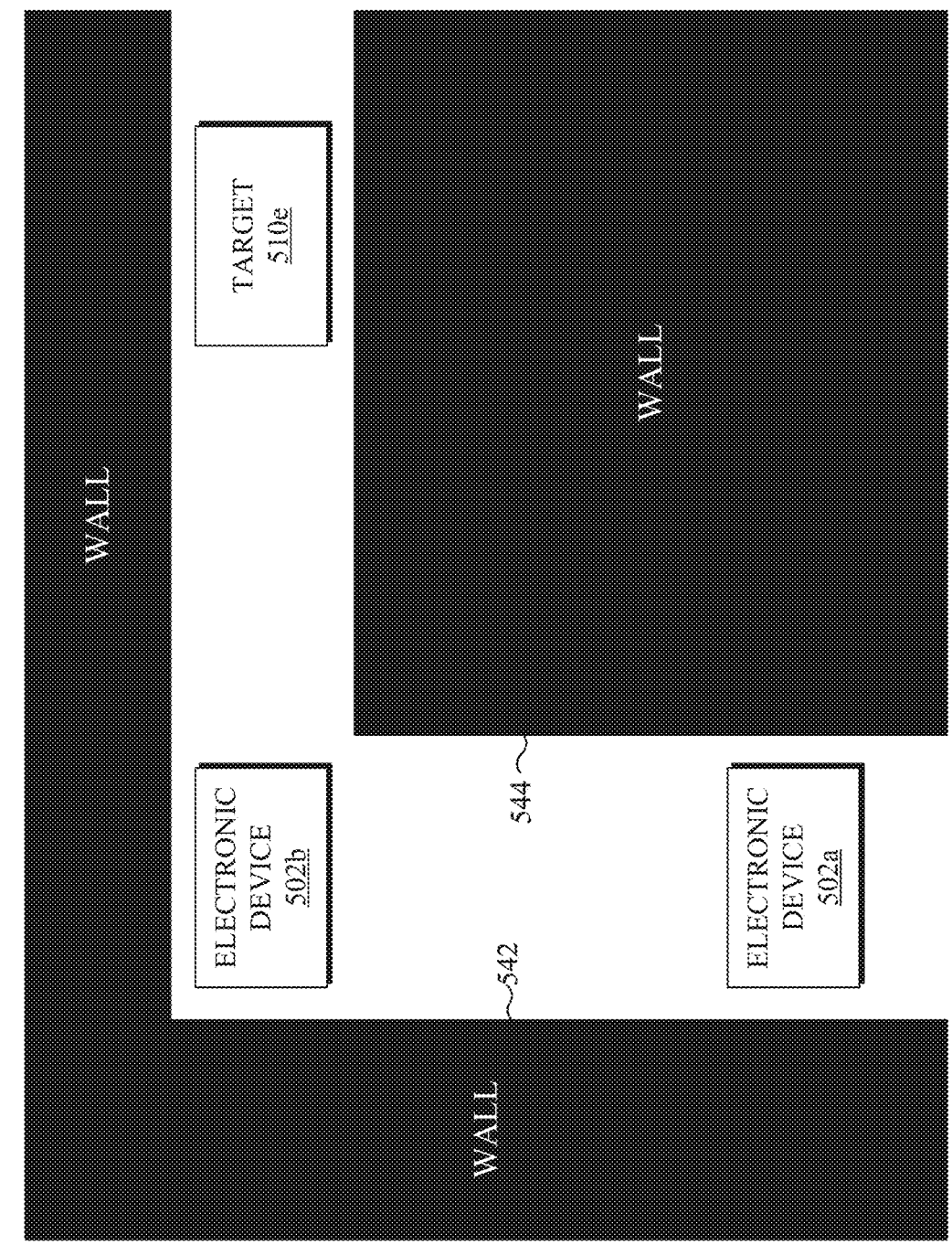

FIGS. 5A, 5B, and 5C illustrates example diagrams of a determination of whether a target device is within a field of view (FoV) of an electronic device according to embodiments of the present disclosure. That is, FIG. 5A illustrates an example diagram 500 of a determination of whether a target device (such as the target device 510a, the target device 510b, or the target device 510c) is within a FoV of an electronic device 502 according to embodiments of the present disclosure. FIGS. 5B and 5C illustrate example diagram 530 and 540 of localizing a target device by collaborative ranging according to embodiments of the present disclosure.

The electronic device 502, the target device 510a, the target device 510b, and the target device 510c can be any one of the client device 106-116 and can include internal components similar to that of electronic device 200 of FIG. 2 and the electronic device 300 of FIG. 3. The determination of whether the target device 510a, 501b or 510b is within the field of view of the electronic device 502 can be performed by the electronic device 502, any one of the client device 106-116 or the server 104 of FIG. 1. For example, the electronic device 502, the target device 510a, the target device 510b, and the target device 510c can be any wireless-enabled device such as the mobile device 108, a smartphone, a smart watch, a smart tag, a tablet computer 114, a laptop computer 112, a smart thermostat, a wireless-enabled camera, a television 116, a wireless-enabled speaker, a wireless-enabled power socket, and the like.

In certain embodiments, the electronic device 502, the target device 510a, the target device 510b, and the target device 510c can include a transceiver, such as the measuring transceiver 370 of FIG. 3. Any other suitable transceiver, receiver, or transmitter may be used. Range and AoA information is obtained based on the exchange of signals between the electronic device 502, and any of the target devices 510a, 510b, and 510c.

The target device 510a, 510b, and 510c can be a phone or a tag attached to a certain object. In certain embodiments, the electronic device 502 attempts to identify the location of a target devices 510a, 510b or 510c with respect to some FoV of the electronic device 502, such as the FoV 524a. In other embodiments, a remote server, such as the server 104 if FIG. 1, receives information from the electronic device 502 and identifies the location of a target device 510a, 510b, or 502c with respect to some FoV of another electronic device (not shown). For example, the remote server, or the electronic device 502a can receive information from the target device 510a for localizing the target device 510b. (this example is described in FIG. 5B).

As shown in FIG. 5A, the determination of whether an external electronic device (such as either of the target devices 510a, 510b, or 510c) is within a FoV of another electronic device (such as the electronic device 502) is based on the size and shape of a FoV. The size and shape of a FoV can be based on environmental factors as well as the distance between devices. As illustrated, a portion of the environment around the electronic device 502 is illustrated as FoV 524a, while another portion of the environment around the electronic device 502 is illustrated as outside FoV 524b. The boundary 520 represents an approximate boundary between the FoV 524a and outside the FoV 524b. The target device 510a is within the FoV 524a, while the target devices 510b and 510c are outside the FoV 524b. For example, the target device 510b is outside FoV 524b due to an environmental obstacle (such as furniture or a wall) that prevents the electronic device 502 from communicating with the target device 510b. For another example, the target device 510b is outside FoV 524b due to a hardware constraints of the electronic device 502 which limits the range of angles that an electronic device can be considered as in the FoV 524a. The target device 510c is outside FoV 524b due to an environmental obstacle (such as furniture or a wall) or is too far away for wireless communication using UWB preventing the electronic device 502 from communicating with the target device 510*c*.

The boresight 522 is the center of the FoV 524*a*. The boresight 522 can be the axis of maximum gain (maximum radiated power) of an antenna (a directional antenna) of the electronic device 502. In some instances, the axis of maximum gain coincides with the axis of symmetry of the antenna of the electronic device 502. In some implementations, the electronic device 502 includes one or more phased array antennas that can electronically steer a beam, change the angle of the boresight 522 by shifting the relative phase of the radio waves emitted by different antenna elements, radiate beams in multiple directions, and the like.

The FoV of an electronic device (such as the FoV 524*a* of the electronic device 502 of FIG. 5A) is a range of angles around the boresight 522, within which the target device (such as the target devices 510*a*, 510*b*, and 510*c*) can be defined as being present based on UWB measurements or other measurements. The size and shape of a FoV can vary based on environmental conditions and the hardware of the electronic device itself.

Embodiments of the present disclosure describe methods for localizing a target device, even if the target device, such as the target device 510*b*, is outside the FoV of the electronic device 502. For example, the diagram 530 of FIG. 5B illustrates an electronic device 502*a* localizing a target device 510*d* using the electronic device 502*b*. Here, the electronic device 502*a* is similar to the electronic device 502 of FIG. 5A, the target device 510*d* is similar to the target device 510*b* of FIG. 5A, and the electronic device 502*b* is similar to the target device 510*a* of FIG. 5A.

For example, as shown in the diagram 530 of FIG. 5B, the electronic device 502*a* has a FoV 520*a*. The electronic device 502*a* can identify and localize the electronic device 502*b*, since the electronic device 502*b* is within the FoV 520*a* of the electronic device 502*a*. However the target device 510*d* is outside the FoV 520*a* of the electronic device 502*a*. The electronic device 502*b* has a FoV 520*b*, in which the electronic device 502*b* identifies and localizes the target device 510*d* and the electronic device 502*a*.

As illustrated, since the target device 510*d* is within the FoV 520*b* of the electronic device 502*b*, the electronic device 502*b* can identify the location of the target device 510*d* relative to its own position. Similarly, since (i) the electronic device 502*b* is within the FoV 520*a* of the electronic device 502*a* and (ii) the electronic device 502*a* is within the FoV 520*b* of the electronic device 502*b*, the electronic device 502*a* can identify the location and orientation of the electronic device 502*b* relative to its own position. Accordingly, in response to the electronic device 502*b* receiving a request from the electronic device 502*a* for the location of the target device 510*d*, the electronic device 502*b* can transmit the location of the target device 510*d* to the electronic device 502*a*. The electronic device 502*a* then converts the received location of the target device 510*d* that was originally in the coordinate system of the electronic device 502*b* to its own coordinate system. Accordingly, the electronic device 502*a* identifies the location of the target device 510*d* even when it cannot localize the target device 510*d* itself.

The diagram 510 of FIG. 5C illustrates another example of an electronic device 502*a* localizing a target device 510*e* using the electronic device 502*b*. The wall 542 and the wall 544 illustrate a sample environment that can be found in a home of a user. Here, the electronic device 502*a* is similar to the electronic device 502 of FIG. 5A, the target device 510*d* is similar to the target device 510*b* of FIG. 5A, and the electronic device 502*b* is similar to the target device 510*a* of FIG. 5A.

As illustrated, the electronic device 502*a* identifies and localizes the electronic device 502*b*. However, the electronic device 502*a* is unable to localize the target device 510*e* due to the wall 544 preventing the electronic device 502*a* from communicating directly with the target device 510*a*. The electronic device 502*b* identifies and localizes the target device 510*d* and the electronic device 502*a*.

In response to the electronic device 502*b* receiving a request from the electronic device 502*a* for the location of the target device 510*e*, the electronic device 502*b* can transmit the location of the target device 510*e* to the electronic device 502*a*. The electronic device 502*a* then converts the received location of the target device 510*e* that was originally in the coordinate system of the electronic device 502*b* to its own coordinate system. Accordingly, the electronic device 502*a* can identify the location of the target device 510*e* even when the electronic device 502*a* cannot localize the target device 510*d* itself.

In this example, the electronic device 502*a* can (i) determine that the target device 510*e* is outside its range and/or FoV and (ii) determine the electronic device 502*b* is within its range and/or FoV. Thereafter the electronic device 502*a* can transmit a request for localizing the target device 510*e* to the electronic device 502*b*. Thereafter the electronic device 502*b* localizes the target device 510*e* and transmits the results back to the electronic device 502*a*. The electronic device 502*a* can then identify the location of the target device 510*e* based partially on the received results from the electronic device 502*b* and on the location of the electronic device 502*b*. This example is referred to as a decentralized approach since the electronic device 502*a* localizes the target device 510*e* without the use of a centralized server or device.

Embodiments of the present disclosure also describe a centralized approach for the electronic device 502*a* to localize the target device 510*e*. In this embodiment, the electronic device 502*a* can (i) determine that the target device 510*e* is outside its range and/or FoV and (ii) determine the electronic device 502*b* is within its range and/or FoV. Thereafter the electronic device 502*a* can transmit a request for localizing the target device 510*e* to a centralized hub. The centralized hub then requests and gathers locations of the target device 510*e*, such as from the electronic device 502*b*. The centralized hub then transmits the location of the target device 510*e* to the electronic device 502*a*.

Figure 6:
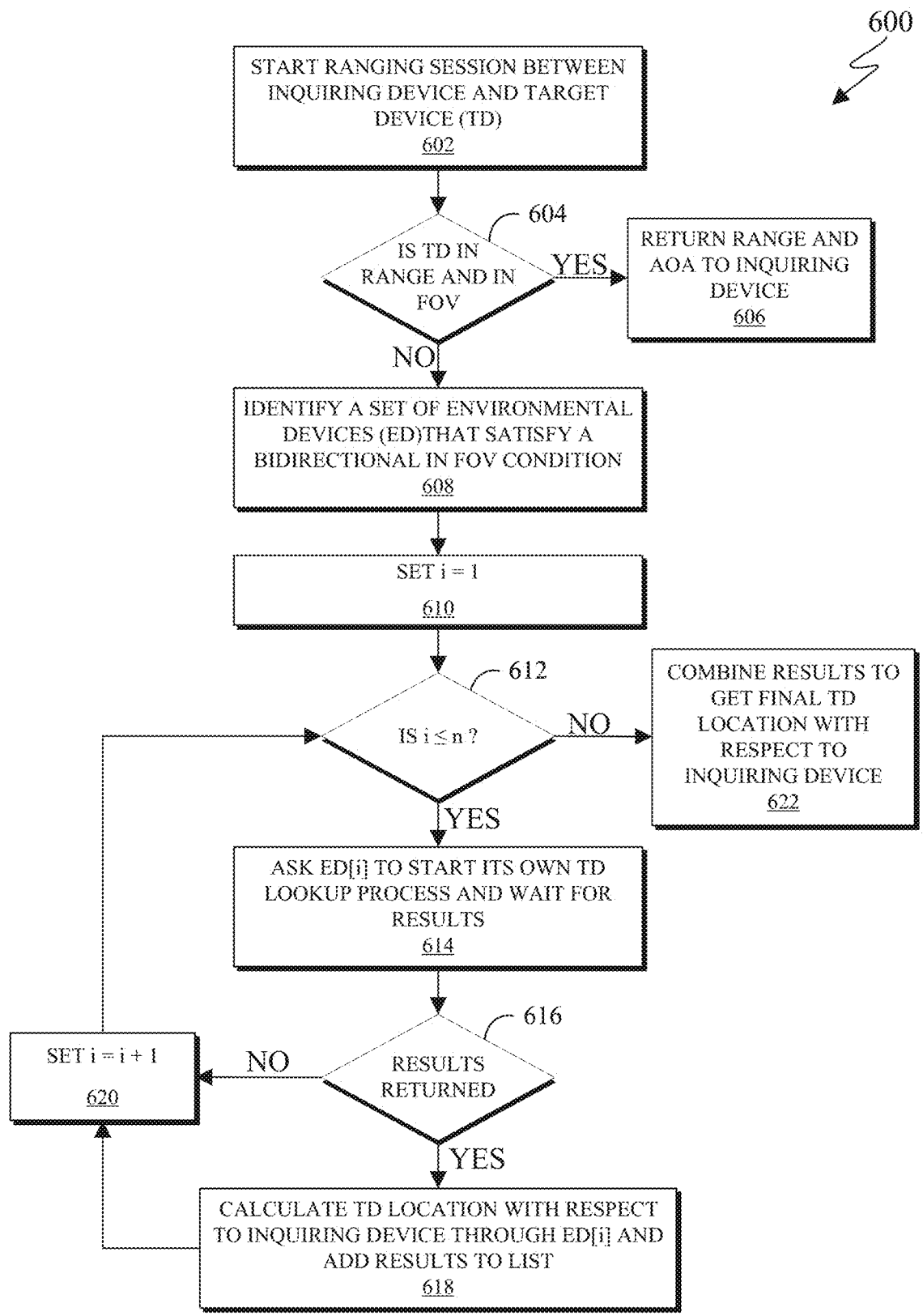
FIG. 6 illustrates an example method for determining a location of a target device according to embodiments of the present disclosure.
Figure 7A:
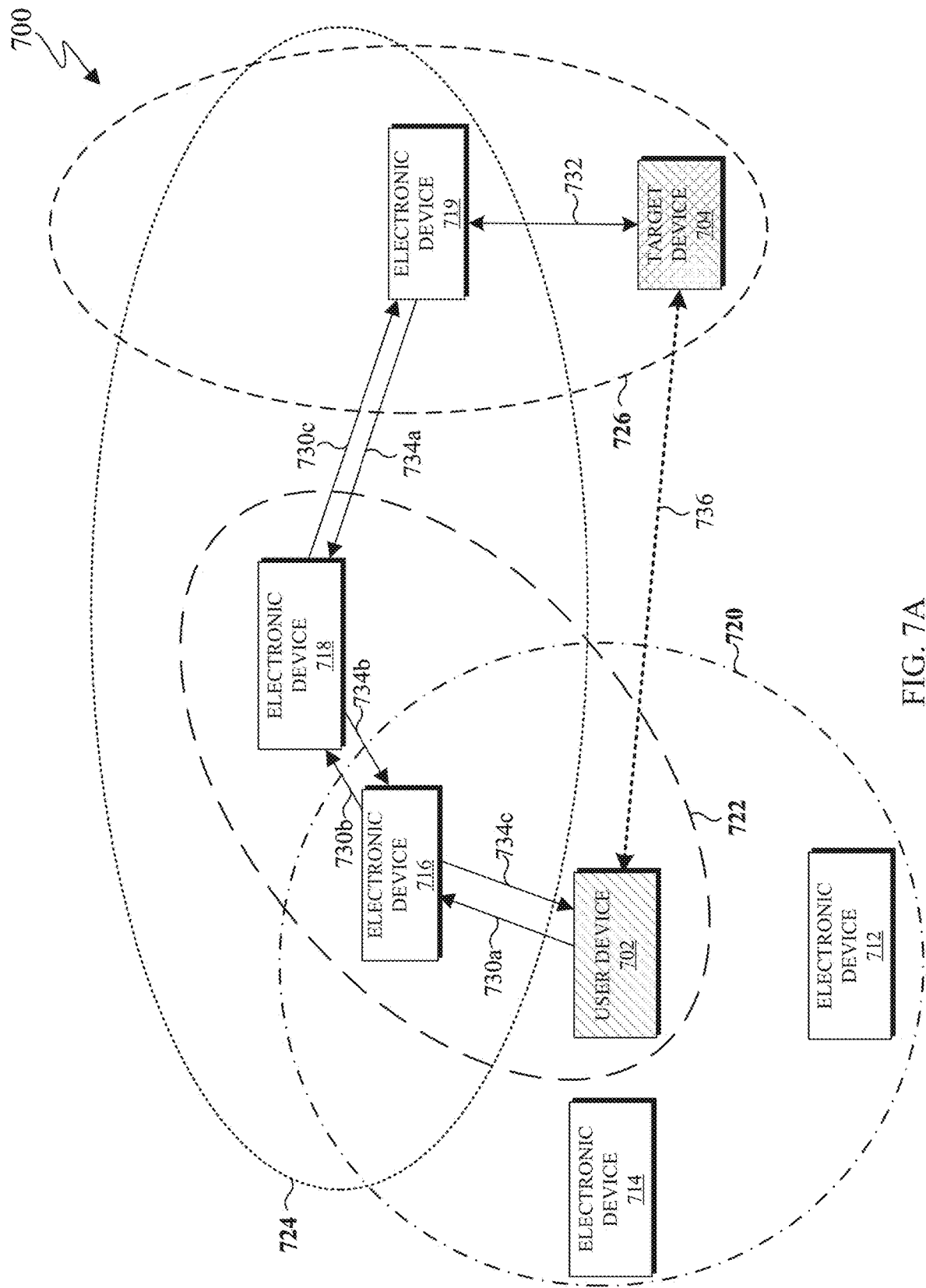
FIG. 7A illustrates an example environment of a user device locating a target device according to embodiments of the present disclosure.
Figure 7B:
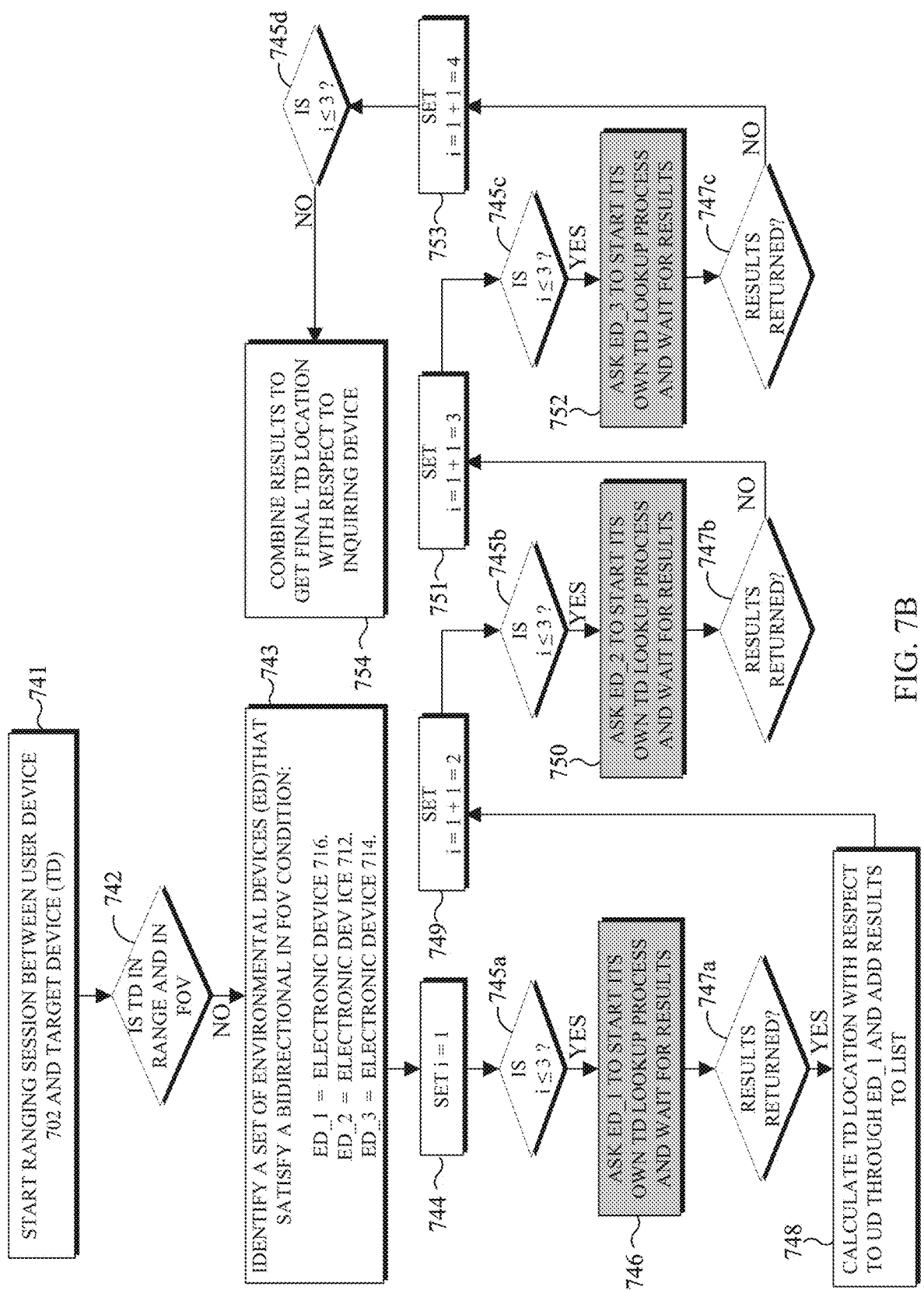
FIGS. 7B, 7C, and 7D illustrate example processes describing the localization method of FIG. 6 for locating the target device of FIG. 7A according to embodiments of the present disclosure.
Figure 7C:
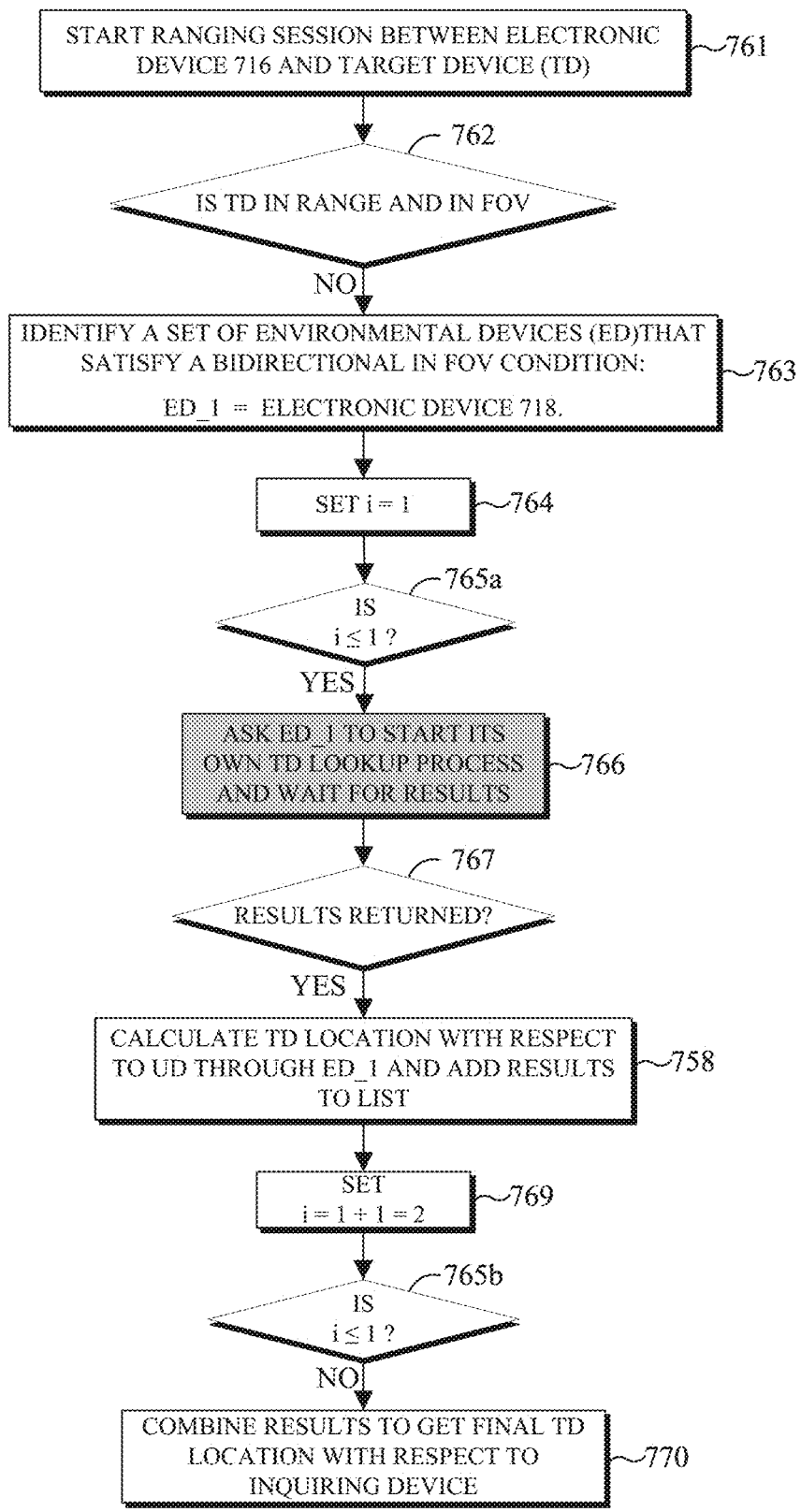
Figure 7D:
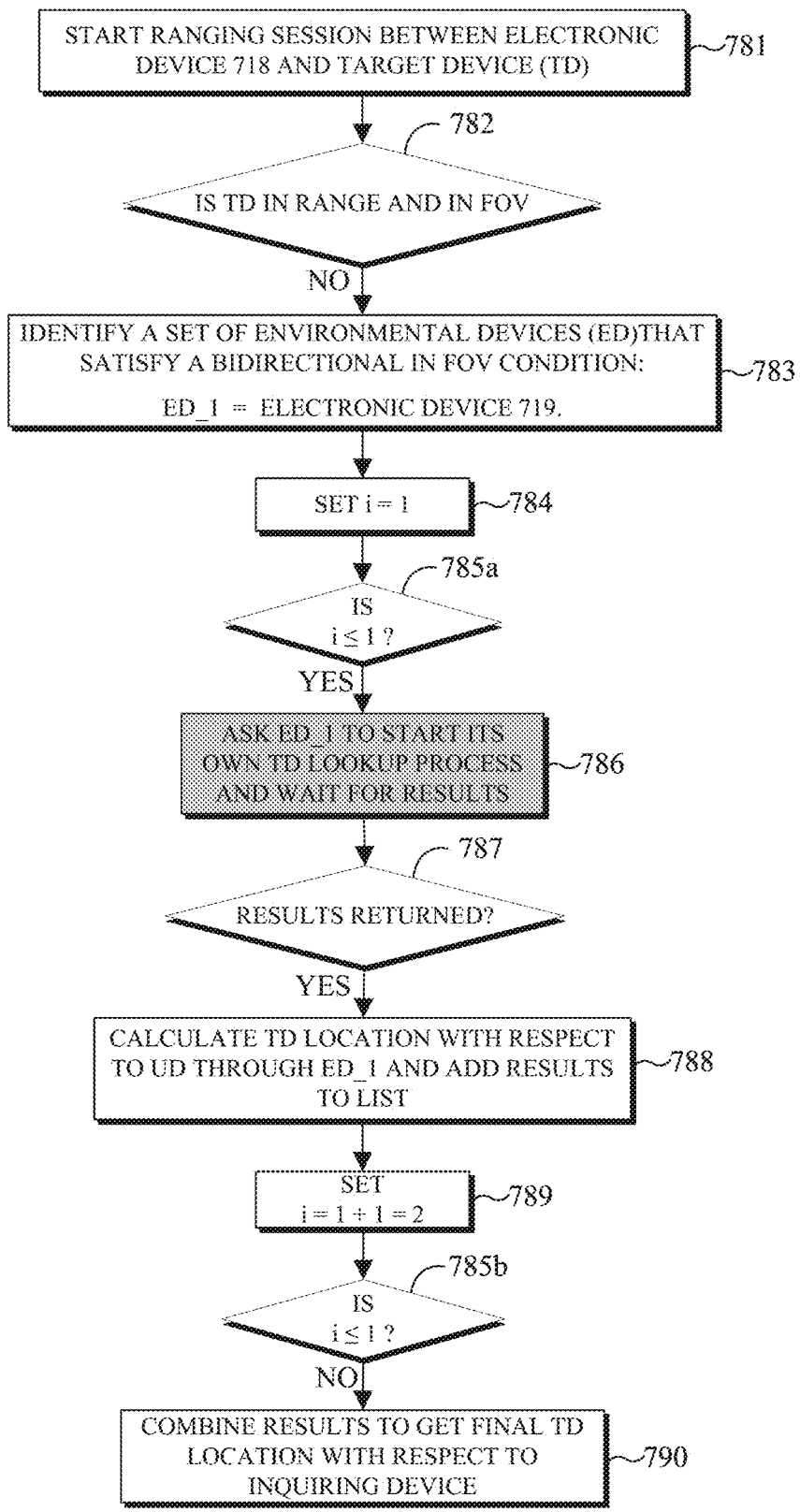
Figure 7E:
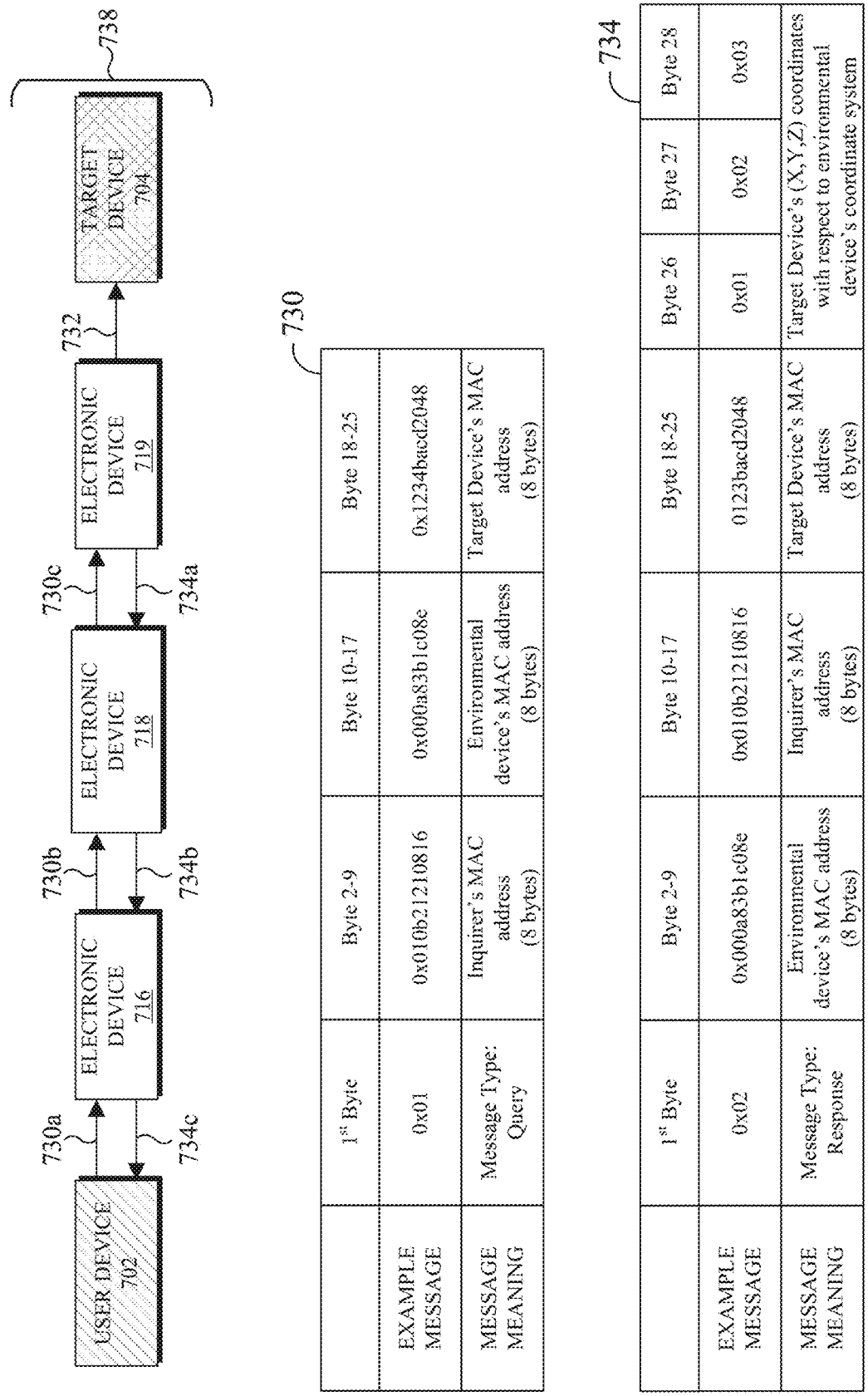
FIG. 7E illustrates example messages that are transmitted between the user device, the electronic devices, and the target device of FIG. 7A according to embodiments of the present disclosure.

FIGS. 6-7E describe a decentralized approach for localizing a target device. The decentralized approach describes a user device (any other client device 106-116, such as any of the mobile device 108) localizing a target device based on measurements received from other environmental devices (such as any of the other client device 106-116). That is, as described in FIGS. 6-7E below, a user device can find a location of a target device (or a tag) by relaying inquiries to one or more of the environmental devices and receiving responses from any of the environmental devices describing the location of the target device. The user device can initiate a target device look up process as described in FIGS. 6-7E.

FIG. 6 illustrates an example method 600 for determining a location of a target device according to embodiments of the present disclosure. FIG. 7A illustrates an example environment 700 of a user device locating a target device according to embodiments of the present disclosure. FIGS. 7B, 7C, and 7D describe the method 600 of FIG. 6 for the user device of FIG. 7A localizing the target device of FIG. 7A according to embodiments of the present disclosure. FIG. 7E illustrates example messages that are transmitted between the user device, the electronic devices, and the target device of FIG. 7A according to embodiments of the present disclosure.

The method 600 is described as implemented by any one of the client device 106-116 of FIG. 1, the server 104 of FIG. 1, the electronic device 502 of FIG. 5A, the electronic devices 502a and 502b of FIGS. 5B and 5C, and can include internal components similar to that of electronic device 200 of FIG. 2 and the electronic device 301 of FIG. 3. However, the method 600 as shown in FIG. 6 could be used with any other suitable electronic device and in any suitable system.

The method 600 describes the target device look up process. In the target device look up process, there is a target device and an inquiring device. The inquiring device seeks to find the position of the target device with respect to the inquirer's own coordinate system. The target device look up process, as described in the method 600, can be performed by the user device and the environmental devices that are co-located in the indoor environment, such as the example environment 700 as shown in FIG. 7A.

In step 602 the user device initiates a ranging session to locate the target device. For example, the user device first attempts to locate the target device using a direct in-band (UWB) ranging session. In step 604, the user device determines whether the target device is in range and in FoV. Here, "in range" is based on the distance that the user device and the target device can transmit and receive signals. Similarly, "in FoV" is based on the received AoA of the target device with respect to the user device, such as the in FoV 524a or out of FoV 524b as described in FIG. 5A. For example, "in range" can be within 0 meters to 5 meters and "in FoV" can be AoA signals that are within the range from −50 degrees to 50 degrees, with 0 degree is at the boresight 522 of the receiving device. It is noted that the example ranges are ranges of distance and AoAs are hardware-dependent for indicating whether the UWB distance and AoA measurements are reliable.

Upon determining that the target device is in range and in FoV of the user device, the user device, in step 606, determines the location of the target device based on range and AoA measurements. The user device then either (i) presents the location of the target device to a user or (ii) transmits the location of the target device to an inquiring device. The inquiring device is a device that instructed the user device to locate the target device.

Alternatively, upon determining that the target device is not in range and/or not in FoV of the user device, the user device, in step 608 the user device is referred to as an inquirer (or inquiring device) and identifies a set of neighboring environmental devices that satisfy a bidirectional in-range-FoV condition. To satisfy the bidirectional in-range-FoV condition, an environmental device needs to be in range and in FoV of the inquirer, and the inquirer also needs to be in range and in FoV of this environmental device. The reason and advantage of using the bidirectional in-range-FoV condition is if the inquirer's location with respect to an environmental device is known and vice versa, the position and orientation of that environmental device with respect to the inquirer can be determined with greater accuracy.

Various methods can be used to identify the set of neighboring environmental devices that satisfy the bidirectional in-range-FoV condition. One such method is an artificial intelligence (AI) based method that operates on the range and AoA measurements, as well as the channel impulse response (CIR) features, to determine whether a target in in-FoV or in-range of an object. This is discussed in further detail below with regards to FoV classifiers, such as in FIGS. 8A and 8B. The AI-based method can be implemented using support vector machine (SVM), random forest, neural network, and the like. In certain embodiments, any of these models can run on the user device, which has a powerful microprocessor. However, other small devices (such as like smart plug, doorknob, and the like) include a simple microcontroller, which in some cases, cannot run an AI based solution. In this cases, these simple devices can report their unprocessed UWB measurements to other AI-enabled devices in the process, and AI-enabled devices with more capability (such as a hub in the centralized approach described below in FIGS. 9A-9D, or the user device) can help determine the in-FoV and in-range conditions.

In step 610, the user device (inquirer) then initializes a variable 'i' to the value of one, and in step 612, the user device (inquirer) compare the value of the variable 'i' to the number of identified environmental devices ("n") that satisfy the bidirectional in-range-FoV condition. The user device can cause each environmental devices to start its own TD look up process in a recursive manner.

Once the set of potential environmental devices are found, and the variable 'i' is less than the number of environmental devices, 'n,' the inquirer, in step 614 will ask one of the identified environmental devices about the location information of the target device through an out-of-band channel (such as Bluetooth). The communication between the inquirer and an environmental device can be based on a standard out-of-band communication standard (such as standards specified by OCF, CHIP, or other standards organizations) that runs on top of different physical communication protocols (Bluetooth, ZigBee, etc.). In a recursive fashion, the environmental device will then start its own TD look up process (by initiating the method 600 starting at step 602) and become the inquirer of this process. If the environmental device obtains the location of the target device, that environmental device will return this result back to the previous inquirer. It is noted that the returned result is based on the coordinate system of that particular environmental device. Otherwise, if the environmental device does not locate the target device (or subsequent environmental devices that eventually locate the target device), then that first environmental device returns no results to the user device (inquirer).

In step 616, the user device determines whether a results is returned from one of the environmental devices. When a result is returned from the environmental device, the user device, in step 618, identifies the location of the TD with respect to its own location for that returned result. Alternatively, the user device can have a preset timer that upon its expiration determines that a result from that particular environmental device will not be returned. The inquirer (such as the user device or any other environmental device) can set a timeout period to wait for results from its list of environmental devices. The timeout period can be chosen based on several factors, such as (i) the expected time it takes for a ranging session to finish, (ii) the maximum number of intermediate environmental device (thus, the number of ranging sessions), and (iii) the amount of time that does not harm user experience (for example a user can expects to wait less than 30-60 second to get a result of the target devices location).

Since each result returned from an environmental device is the location of the target device with respect to that environmental device, once the inquirer receives this result, the inquirer performs an operation (such as matrix multiplication operation) to obtain the location of the target device with respect to its own coordinate system. This result will then be saved into the inquirer's list of possible target devices locations.

In step 620, after the user device (inquirer) identifies the location of the target device, or receives no results, the user device (inquirer), increases the value of 'i' by one. In step 612, the user device (inquirer) compare the new value of the variable 'i' to the number of environmental devices that satisfy the bidirectional in-range-FoV condition. If the number of 'i' is less than the number of environmental devices, then the user device repeats step 614 and asks another one of the identified environmental devices about the location information of the target device through an out-of-band channel (such as Bluetooth). The user device (inquirer) continues requesting additional environmental devices for the location of the target device and subsequently increasing the variable 'i' in response to receiving a response or receiving no response, until the variable 'i' is equal to the number of environmental devices.

When the user device (inquirer) determines that the variable 'i' is greater than the number of environmental devices, then in step 622, the user device (inquirer) combines the results received from the environmental devices to generate a final location of the target device with respect to itself. In certain embodiments, the user device can combine the results based on an average of the returned results that indicate candidate locations of the target device. In other embodiments, the weighted average of the returned results that indicate candidate locations of the target device. For example, each result that is returned from an environmental device can include a confidence value that is used for calculating the weighted average.

In certain embodiments, a user device (inquiring device) can use different strategies for combining results. For example, a user device (inquiring device) can select a different strategy to reduce latency caused by waiting for results from all 'n' environmental devices. For instance, if the returned results from environmental devices do not have associated confidence values, the inquiring device can choose one or a few first results that are returned from some environmental devices to move forward to the step of estimating the location of the target device. Any later results that are received from other environmental devices would be rejected. Alternatively, if the returned results from environmental devices are associated with confidence values, the inquiring device can set an acceptable threshold 't'. Then when a result from an environmental device has the confidence value greater than the threshold 't', the inquiring device would accept this result to move forward to the step of estimating the location of the target device and the later results from other environmental devices would be discarded. This approach would help reduce the waiting time for the inquiring device and the other inquiring device up the chain (including the user device).

For another example, the inquiring device can prioritize the results of the best possible quality. This applies to the case when the results returned from environmental devices are associated with some confidence values. Once the timeout period expired, the inquiring device will rank the collected results from environmental devices from high to low confidence values. The above result combination process can then be applied to the K results with highest confidence values, or the results with confidence values above some threshold. This example ensures that the estimated location of the target device would be of high quality to all the inquirers up the chain (including the user device).

After the result combination process finishes, the inquiring device has the final estimated location of the target device. If the inquiring device is the original user device, this estimated location of the target device can be used in the apps running on the user device. If the inquiring device is an environmental device that was inquired by the other device (which can be another environmental device or user device), it will return this estimated location of the target device to the original inquiring device through the out-of-band communication channel that was set up previously. For example, a previous inquiring device may have asked an environmental device about the location of the target device through Bluetooth, and the environmental device now returns the results to the inquiring device through the same Bluetooth channel.

The environment 700 of FIG. 7A includes various electronic devices such as a user device 702, an electronic device 712, an electronic device 714, an electronic device 716, an electronic device 718, an electronic device 719, and a target device 704. The electronic devices can be similar to any of the client devices 106-116 or an access point 120 of FIG. 1. Some of electronic devices of the environment 700 can be movable devices and some of the electronic devices of the environment 700 can be immovable devices. For example, the user device 702 can be a mobile device 108, the electronic device 712 can be a smart lock, the electronic device 714 can be an air conditioner, the electronic device 716 can be a television (such as the television 116), the electronic device 718 can be an access point (such as the access point 120), the electronic device 719 can be an appliance (such as the refrigerator 115). The electronic devices 702-719 can include measuring transceiver (or a receiver and a transmitter) capable of using an out-of-band channel and a UWB channel.

The electronic devices can perform wireless communication (via the out-of-band channel and the UWB channel) within a coverage area, such as the coverage areas 720, 722, 724, and 726. As illustrated the user device 702 can perform wireless communication within the coverage area 720; the electronic device 716 can perform wireless communication within the coverage area 722; the electronic device 718 can perform wireless communication within the coverage area 724; and the electronic device 719 can perform wireless communication within the coverage area 726. The electronic devices 712 and 714 also include coverage area, which are not shown in the FIG. 7A.

Dotted lines show the approximate extents of the coverage areas 720, 722, 724, and 726, which are shown as approximately circular for the purposes of illustration and explanation only. It should be clearly understood that the coverage areas associated the electronic devices, such as the coverage areas 720, 722, 724, and 726, may have other shapes, including irregular shapes, depending upon the configuration of the transceivers and variations in the radio environment associated with natural and man-made obstructions.

The user device 702 initially attempts to locate the target device 704, via communication channel 736 (step 602 of FIG. 6). The user device 702 may be unable to locate the target device 704, such as when the target device 704 is out of range and outside the FoV of the user device 702. As illustrated, the target device 704 is outside the coverage area 720 of the user device 702. When the user device 702 is unable to locate the target device 704 the target device look up process, as described in the method 600, enables the user device 702 to still locate the target device 704. For example, the user device 702 can identify various environmental devices (via step 608 of FIG. 8) such as the electronic device 712, the electronic device 714, and the electronic device 716 that are within its coverage area 720. The electronic devices 712, 714, and 716 (becomes inquirers in subsequent communication stages) and perform their own target device look up process as described in the method 600.

As illustrated in FIG. 7A, the target device 704 is out of range and outside the FoV of the electronic devices 712, 714, and 716, but by performing the target device look up process enables the electronic device 716 to locate an electronic device 718. However, the electronic devices 712 and 714 may not return any results as there are no other environmental devices within range and within FoV.

The electronic device 718 (becomes the inquirer in this subsequent communication stage) then performs the target device look up process as described in the method 600. As illustrated in FIG. 7A, the target device 704 is out of range and outside the FoV of the electronic device 718, but by performing the target device look up process enables the electronic device 718 to locate an electronic device 719. The electronic device 719 (becomes the inquirer in this subsequent communication stage) then performs the target device look up process as described in the method 600. As illustrated in the FIG. 7A, the target device 704 is in range and inside the FoV of the electronic device 719 (since the target device 704 is within the coverage area 726 of the electronic device 716). The location of the target device is then calculated with respect to the coordinate system of the electronic device 719. This initial location result is then forwarded to the electronic device 718, which then calculates the target device's 704 location with respect to the electronic devices 718 own coordinate system. This result is then forwarded to the electronic device 716, which then calculates the target device's 704 location with respect to its (the electronic device 716) own coordinate system. This result is then forwarded to the user device 702, which then calculates the location of the target device 704 with respect to its (the user device 702) own coordinate system. Therefore, the location of the target device is propagated down the chain of environmental devices to the user device. At each inquirer in the chain, the target device's location is expressed with respect to the inquirer's own coordinate system before forwarding the target device's location to the next device in the chain.

FIGS. 7B-7D describe an example application of the method 600 with respect to an environment 700, as shown in FIG. 7A. FIG. 7B describes the user device 702 performing the target device look up process corresponding to the coverage area 720. FIG. 7C describes the electronic device 716 performing the target device look up process corresponding to the coverage area 722. FIG. 7D describes the electronic device 718 performing the target device look up process corresponding to the coverage area 724.

In step 741, of FIG. 7B, the user device 702 starts a ranging initiates a ranging session to locate the target device 704, in response to a user input. In step 742 the user device 702 determines that the target device is not in range and not in FoV. Then, in step 743, the user device 702 identifies all of the environmental devices within its coverage area 720. For example, the user device 702 identifies the three environmental devices, corresponding to the electronic device 712, the electronic device 714, and the electronic device 716.

In step 744, the user device 702 (inquirer) then initializes a variable 'i' to the value of one, and in step 745a, the user device (inquirer) compare the value of the variable 'i' to the number three which is the environmental devices that satisfy the bidirectional in-range-FoV condition.

After the user device 702 determines that 'i' (which is currently set to the value of one) is less or equal to three (step 745a), the user device 702 in step 746 sends a request the electronic device 716 to perform its own look up process and waits for results. The user device 702 can cause each of the environmental devices to start their own target device look up process in a recursive manner. The generation of the results from the electronic device 716 is described in FIGS. 7C and 7D. In step 747a, the user device 702 determines that results from the electronic device 716 are received. Thereafter, in step 748, the user device 702 identifies the location of the target device 704 with respect to its own coordinate system and adds the results to a list of candidate locations.

Then in step 749, the user device 702 incrementally increases the value of 'i' (from one to two). The user device 702 in step 745b determines that 'i' (which is currently set to the value of two) is less than or equal to three (which is the number of identified environmental devices from step 743). In response to the determination, the user device 702 in step 750 sends a request the electronic device 712 to perform its own look up process and waits for results.

After a predetermined period of time elapses with no results provided by the electronic device 712, the user device 702 determines (in step 747b) that no results will be returned and incrementally increases the value of 'i' (from two to three) in step 751. The user device 702 then determines that 'i' (which is currently set to the value of three) is less or equal to three (step 745c), the user device 702 in step 752 sends a request to the electronic device 714 to perform its own look up process and waits for results.

After a predetermined period of time elapses with no results provided by the electronic device 714, the user device 702 determines (in step 747c) that no results will be returned and incrementally increases the value of 'i' (from three to four) in step 753. In step 745d, the user device determines that 'i' (which is currently set to the value of four) is greater than three (step 745d). In response to determining that 'i' is currently greater than the number of environmental devices (in this case three), the user device 702, in step 754, combines results to generate a final location of the target device 704 with respect to its own coordinate system.

FIG. 7C describes a second target device look up process that is initiated in response to the user device 702 requesting that the electronic device 716 start its own look up process, in step 746. Here, the electronic device 716 becomes the inquirer. In step 761, of FIG. 7C, the electronic device 716 starts a ranging initiates a ranging session to locate the target device 704, in response to the inquiry from the user device 702 of step 746. In step 762 the electronic device 716 determines that the target device is not in range and not in FoV. Then, in step 763, the electronic device 716 identifies all of the environmental devices within its coverage area 722. For example, the electronic device 716 identifies the one environmental devices that of the electronic device 718.

In step 764, the electronic device 716 (inquirer) initializes a variable 'i' to the value of one, and in step 765a, the electronic device 716 (inquirer) compare the value of the variable 'i' to the number one which is the number environmental devices that satisfy the bidirectional in-range-FoV condition.

After the electronic device 716 determines that 'i' (which is currently set to the value of one) is less or equal to one (step 765a), the electronic device 716 in step 766 sends a request to the electronic device 718 to perform its own look up process and waits for results. The electronic device 716 can cause the environmental device (the electronic device 718) to start its own target device look up process in a recursive manner. The generation of the results from the electronic device 718 is described in FIG. 7D. In step 767, the electronic device 716 determines that results from the electronic device 718 are received. Thereafter, in step 768, the electronic device 716 identifies the location of the target device 704 with respect to its own coordinate system and adds the results to a list.

Then in step 769, the electronic device 716 incrementally increases the value of 'i' (from one to two). The electronic device 716, in step 765*b*, determines that 'i' (which is currently set to the value of two) is greater than the number one (which is the number of environmental devices that the electronic device 716 identified within its coverage area 722). In response to determining that 'i' is currently greater than the number of environmental devices, the electronic device 716, in step 770, combines results to generate a final location of the target device 704 with respect to its own coordinate system.

FIG. 7D describes a third target device look up process that is initiated in response to the electronic device 716 requesting that the electronic device 718 start its own look up process, in step 766. Here, the electronic device 718 becomes the inquirer. In step 781, of FIG. 7D, the electronic device 718 starts a ranging initiates a ranging session to locate the target device 704, in response to the inquiry from the electronic device 716 of step 766. In step 782 the electronic device 718 determines that the target device is not in range and not in FoV. Then, in step 783, the electronic device 718 identifies all of the environmental devices within its coverage area 724. For example, the electronic device 718 identifies the one environmental devices that of the electronic device 719.

In step 784, the electronic device 718 (inquirer) initializes a variable 'i' to the value of one, and in step 785*a*, the electronic device 718 (inquirer) compare the value of the variable 'i' to the number one which is the number environmental devices that satisfy the bidirectional in-range-FoV condition.

After the electronic device 718 determines that 'i' (which is currently set to the value of one) is less or equal to one (step 785*a*), the electronic device 718 in step 786 sends a request to the electronic device 719 to perform its own look up process and waits for results. The electronic device 718 can cause the environmental device (the electronic device 719) to start its own target device look up process in a recursive manner. In step 787, the electronic device 718 determines that results from the electronic device 719 are received. Thereafter, in step 788, the electronic device 718 identifies the location of the target device 704 with respect to its own coordinate system and adds the results to a list.

Then in step 789, the electronic device 718 incrementally increases the value of 'i' (from one to two). The electronic device 718, in step 785*b*, determines that 'i' (which is currently set to the value of two) is greater than the number one (which is the number of environmental devices that the electronic device 718 identified within its coverage area 722). In response to determining that 'i' is currently greater than the number of environmental devices, the electronic device 718, in step 790, combines results to generate a final location of the target device 704 with respect to its own coordinate system.

A fourth target device look up process is initiated in response to the electronic device 718 requesting that the electronic device 719 start its own look up process, in step 786. Here, the electronic device 719 becomes the inquirer.

The electronic device 719 starts a ranging initiates a ranging session to locate the target device 704, As illustrated by communication 732 of FIG. 7A, the electronic device 719 determines that the target device is in range and in FoV. Then, the electronic device 719 determines the location of the target device relative to its own position. The electronic device 719 then transmits the results back to the electronic device 718.

FIG. 7E illustrates the string of messages 738 that occurred between each of the electronic devices of FIG. 7A, as well as an example message format of the individual message included in the string of messages 738. Each inquiring device transmits an inquiry message 730 to an environmental device. The inquiry message 730 requests that the environmental device perform its own target device look up procedure. In response to the inquiring device transmitting the inquiry message 730, the inquiring device may receive a response message 734 from each of the environmental devices to the inquiry message 730 was transmitted. The response message 734 includes a location of the target device 704.

For example, the user device 702 transmits the inquiry message 730*a* to the electronic devices 712, 714 and 716. However, the user device 702 receives the response message 734*c* from the electronic device 716. Similarly, the electronic device 716 transmits the inquiry message 730*b* to the electronic device 718 and receives a response message 734*b* from the electronic device 718. The electronic device 718 transmits the inquiry message 730*c* to the electronic device 719 and receives a response message 734*a* from the electronic device 719. The inquiry messages 730*a*, 730*b*, and 730*c* are collectively referred to as inquiry message 730. Similarly, the response messages 734*a*, 734*b*, and 734*c* are collectively referred to as response message 734.

In certain embodiments, the inquiry message 730 and the response message 734 describe message formats between inquirer and environmental device through an out-of-band channel. The inquiry message 730 (represents any one of the inquiry messages 730*a*, 730*b*, or 730*c*) is sent from the inquirer to an environmental device and is composed of: a 1st byte is 0x01 (indicating message type is query), bytes 2-9 is the inquirer's MAC address, bytes 10-17 is the MAC address of the environmental device being queried, bytes 18-25 is the MAC address of the target device. After the environmental device finishes its target device look up process and obtains a result, the environmental device sends the result back to the inquirer through a response message 734.

The response message 734 (represents any one of the response messages 734*a*, 734*b*, or 734*c*) is composed of: 1st byte is 0x02 (indicating message type is response), bytes 2-9 is the MAC address of the environmental device, bytes 10-17 is the MAC address of the inquirer, bytes 18-25 is the MAC address of the target device, bytes 26, 27, 28 are the (X, Y, Z) coordinates of the target device with respect to the environmental device's coordinate system. Note that for each pair of query-response messages, the MAC address of the inquirer, environmental device, and target device are the same.

Although FIG. 6 illustrates an example method, various changes may be made to FIG. 6. For example, while the method 600 is shown as a series of steps, various steps could overlap, occur in parallel, occur in a different order, or occur multiple times. In another example, steps may be omitted or replaced by other steps.

Figure 8A:
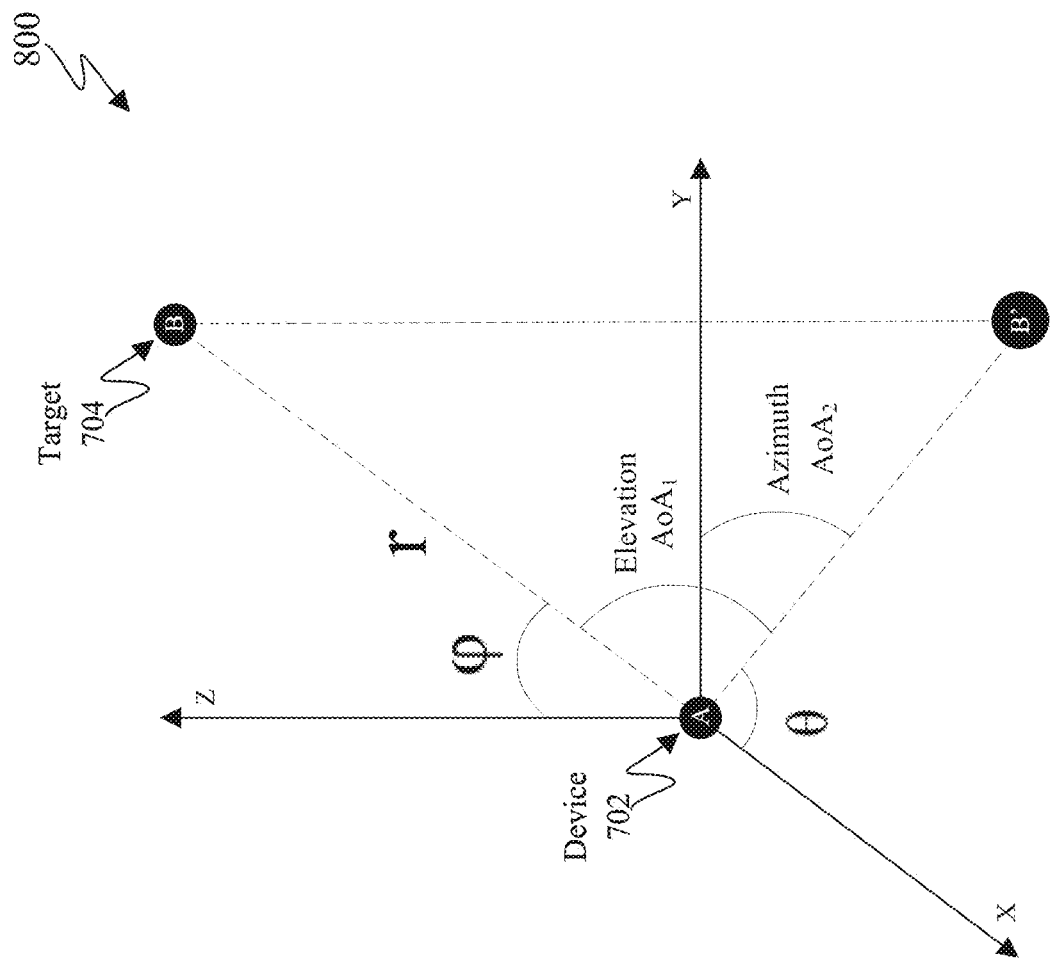
FIG. 8A illustrates an example coordinate system according to embodiments of the present disclosure.
Figure 8B:
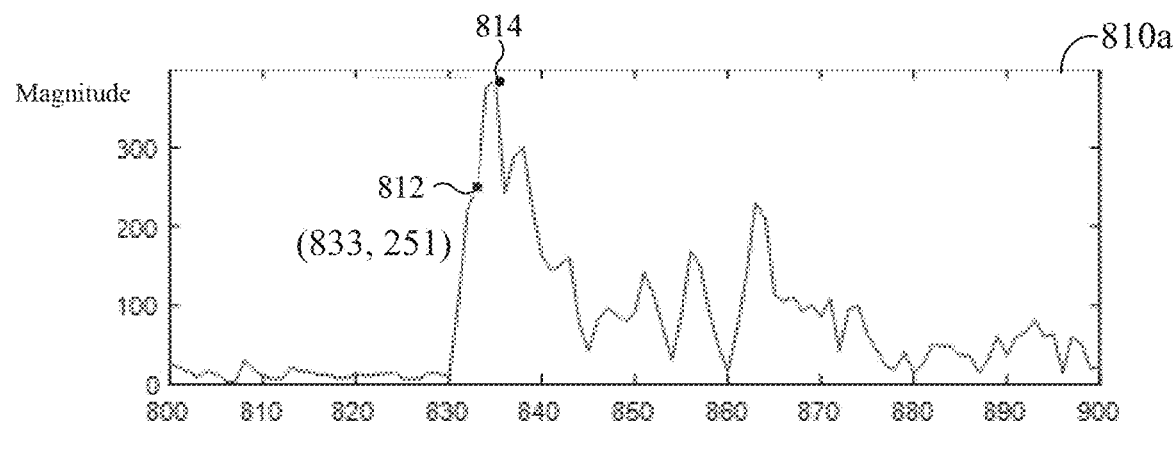
FIG. 8B illustrates example channel impulse response (CIR) graphs according to embodiments of the present disclosure.
Figure 8B:
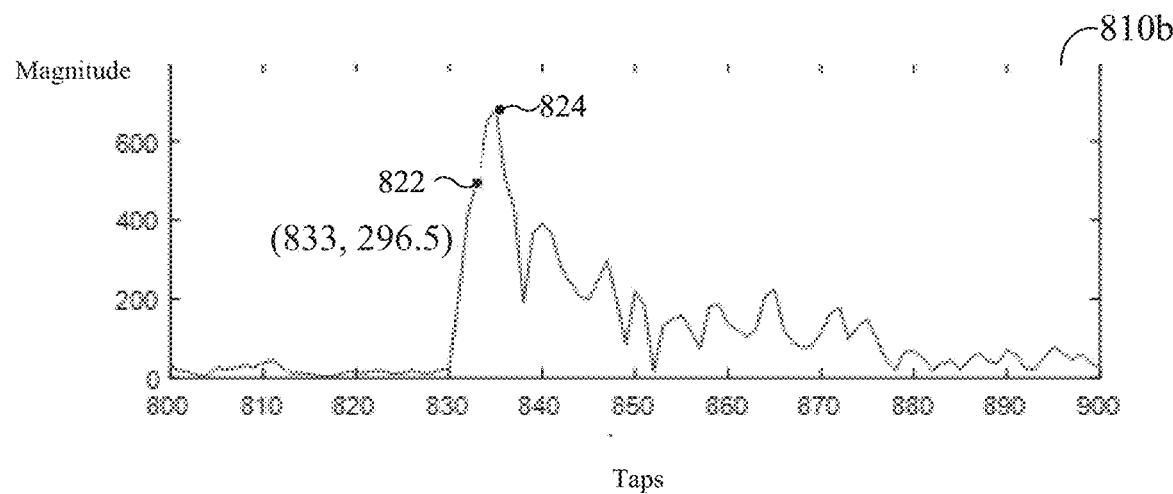

FIG. 8A illustrates an example coordinate system 800 according to embodiments of the present disclosure. FIG. 8B illustrates example CIR graphs 810a and 810b according to embodiments of the present disclosure.

As shown in FIG. 8A, the coordinate system 800 can be used to find the distance and the relative angle that the target device 704 is from the user device 702. The distance and the relative angle between the target device 704 and the user device 702 correspond to the range and AoA measurements when the target device 704 is within the FoV of the user device 702. The coordinate system 800 illustrates the azimuth angle and the elevation angle between the two devices. As illustrated, the azimuth angle is the horizontal angle between the user device 702 and the target device 704. Similarly, the elevation angle is the vertical angle between the user device 702 and the target device 704. The coordinate system 800 illustrates the range, r, (distance) between the user device 702 and the target device 704.

For example, if the target device 704 is in-range-FoV of the user device 702. In this case, the UWB measurements of the target device 704 with respect to user device 702 can be obtained in the form of 3 values as expressed in Equation (4).

$$(r, AoA_1, AoA_2) \quad (4)$$

Here, r is the distance between A and B. $AoA_1$ is the angle between Ay axis and the projection of vector $\overrightarrow{AB}$ onto the plane Axy. $AoA_2$ is the angle between vector $\overrightarrow{AB}$ and its projection onto the plane Axy.

It is noted that the coordinate corresponding to the target device 704 with respect to coordinate system of the user device 702 can be defined based on Equations (5), (6), and (7).

$$x_B = r \cdot \cos(AoA_2) \cdot \sin(AoA_1) \quad (5)$$

$$y_B = r \cdot \cos(AoA_2) \cdot \cos(AoA_1) \quad (6)$$

$$z_B = r \cdot \sin(AoA_2) \quad (7)$$

For example, referring to FIG. 5B, the electronic device 502a and the electronic device 502b, satisfy bidirectional in-range-FoV condition. As such the coordinate of the electronic device 502b with respect to electronic device's 502a coordinate system is denoted $(x_E^I, y_E^I, z_E^I)$ and can be derived based on Equations (5)-(7). Similarly, the electronic device 502a coordinate with respect to electronic device's 502b coordinate system is denoted $(x_I^E, y_I^E, z_I^E)$ and can be derived based on Equations (5)-(7). Since the target device 510d is in-range-FoV of the electronic device 502b, then the target device's 510d coordinate with respect to the coordinate system of electronic device 502b is denoted $(x_T^E, y_T^E, z_T^E)$ and can be derived based on Equations (5)-(7). However, since the target device 510d is not in-range-FoV of the electronic device 502a, then the target device's 510d coordinate with respect to electronic device 502a coordinate system (denoted $(x_T^I, y_T^I, z_T^I)$) cannot be derived directly from UWB measurements. However, a coordinate transform can be performed such that the electronic device 502a can determine the coordinates of the target device 510d.

In certain embodiments, the coordinate transformation process is based on matrix multiplication. First, an electronic device calculates the transformation matrix that transforms from environmental devices coordinate system to inquiring devices coordinate system. The transformation matrix, as shown in Equation (9), includes the rotation between frames in the top left 3×3 matrix and the translation between the two coordinate systems in the first three rows of the fourth column.

$$\begin{bmatrix} r_{xx} & r_{xy} & r_{xz} & t_x \\ r_{yx} & r_{yy} & r_{yz} & t_y \\ r_{zx} & r_{zy} & r_{zz} & t_z \\ 0 & 0 & 0 & 1 \end{bmatrix} \quad (9)$$

The coordinate transform process can be done through a set of matched position measurements of several points as observed in both coordinate systems. The transformation matrix has 6 degrees of freedom (3 for rotation and 3 for translation), so 2 3-D points are sufficient to find this transformation matrix. It is noted that two points since the environmental devices and the inquiring devices have known coordinated in both coordinate systems. More points can be added to improve the accuracy of the solution. In certain embodiments, another mobile devices being visible to the 2 devices (both the environmental device and the inquiring device) can provide many additional points when it moves. In another embodiment, several other devices in the environment that are visible to both environmental device and the inquiring device can provide additional points to the problem.

Once the transformation matrix is known, the desired coordinate of the target device with respect to inquiring device coordinate system can be calculated described in Equation (10).

$$\begin{bmatrix} x_T^I \\ y_T^I \\ z_T^I \\ 1 \end{bmatrix} = \begin{bmatrix} r_{xx} & r_{xy} & r_{xz} & t_x \\ r_{yx} & r_{yy} & r_{yz} & t_y \\ r_{zx} & r_{zy} & r_{zz} & t_z \\ 0 & 0 & 0 & 1 \end{bmatrix} \begin{bmatrix} x_T^E \\ y_T^E \\ z_T^E \\ 1 \end{bmatrix} \quad (10)$$

As described above, after the timeout period expires, the inquiring device will start combining results. In certain embodiments, the final location of the target device (with respect to the inquirer's own coordinate system) can be the average of all the possible target device locations. In other embodiments, when each result returned from an environmental device is associated with a confidence value, the final target device's location (with respect to the inquirer's own coordinate system) can be the weighted average of all the possible target device locations with the confidence value as the weight for each component location.

In certain embodiments, a confidence value is generated by a FoV classifier. An inquiring device can receive a confidence value along with a candidate location of the target device from environmental device. The inquiring device uses the received confidence values corresponding to respective candidate locations of the target device by using a weighted average to generate the final location of the target device.

A FoV classifier, of an environmental device can generate a confidence value based on labeling the target to be in 'FoV' or 'out-of-FoV' of a device based on UWB measurements. FoV classification can be performed using deterministic logic, using a classical machine learning classifier or a deep learning classifier. The classifiers that can be used include, but are not limited to, K-Nearest Neighbors (KNN), SVM, Decision Tree, Random Forest, Neural Network, Convolutional Neural Network (CNN), Long Short Term Memory (LSTM). These FoV classifiers can also be used to identify the set of neighboring environmental devices that satisfy the bidirectional in-range-FoV condition.

Training data can be collected by obtaining multiple measurements between the device and the target in FoV and out-of-FoV in both LoS and Non-line-of-sight (NLoS) setup. To add variation to the data, measurements can be taken at different ranges between the device and the target up to a maximum usable range. Also, the environment of data collection can be varied, for example data can be collected in an open space environment or in a cluttered environment prone to multipath. More variations can be added by changing the tilting angle of the device and target, and by rotating the target at different angles. All the measurements can be labeled as per the application depending on which scenario or setup is required to be labeled as FoV and which one is supposed to be out-of-FoV.

Certain features from UWB measurements that can be used for classical machine learning classifiers include (i) statistics (such as mean or variance) on the measurements themselves (such as range, raw AoA measurements), and (ii) features from the CIR of the wireless channel between the device and the target.

For example, FIG. 8B illustrates example CIR graphs 810a and 810b according to embodiments of the present disclosure. In certain embodiments, the CIR graphs 810a and 810b can be created by any one of the client device 106-114 or the server 104 of FIG. 1 and can include internal components similar to that of electronic device 200 of FIG. 2 and the electronic device 301 of FIG. 3.

The CIR graphs 810a and 810b of FIG. 8B represent CIR plots from two different antennae. For example, the CIR graph 810a represents the CIR from one antenna of an electronic device and the CIR graph 810b represents the CIR from another antenna of the same electronic device. The CIR graphs 810a and 810b shows the signal power vs. tap index of a received signal. The range and AoA measurements can be calculated based on the earliest peak with sufficient signal-to-noise ratio (SNR) in the CIR plot. The features derived from the CIR can be used to classify whether target device is in FoV.

The features derived from the CIR graphs 810a and 810b can be used to classify, whether target device is in a FoV of an electronic device (such as the user device, or an environmental device). The CIR features can include: (i) absolute strength of one or multiple peaks in CIR, normally represented SNR; (ii) difference in signal strength among multiple peaks in CIR, normally represented by SNR; (iii) time differences between multiple peaks in the CIR; (iv) phase relationship among multiple antennas used to generate the AoA information; (v) other features derived from the amplitude and phase around the peaks; and (vi) and the like.

In certain embodiments, various feature vectors can be derived for generating the location information indicating whether the target device is within the FoV of the electronic device. The feature SNRFirst corresponds to the first peak strength 812 (or the first peak strength 822) of FIG. 8B and the feature SNRMain corresponds to the strongest peak strength 814 (or the strongest peak strength 824) of FIG. 8. The feature ToAGap is the difference between first peak strength 812 and strongest peak strength 814. In certain embodiments, AoA measurements are estimated based on the phase difference from multiple antennas including, but not limited to, SNRFirst, SNRMain and ToAGap. Example feature vector could be expressed as:

$$\text{Feature Vector}=[\text{SNRFirst},\text{SNRMain}-\text{SNRFirst},\text{AoA}] \quad (11)$$

$$\text{Feature Vector}=[\text{SNRFirst},\text{SNRMain}-\text{SNRFirst},\\ \text{ToAGap},\text{AoA}] \quad (12)$$

It is noted that other ordering of the features in the feature vectors as shown in Equations (11) and (12) are possible. Other features vectors, in addition to the feature vectors as shown in Equations (11) and (12) are possible.

Equation (11) and Equation (12) describes the feature vector represented by a first peak strength 812 (denoted as SNRFirst), a difference between strongest peak strength 814 (SNRMain) and first peak strength 812, and AoA. Additionally, Equation (12) describes the additional feature vector that includes the ToAGap feature.

There are several ways in which these features (such as the SNRFirst, SNRMain, ToAGap, and the like) can be used to identify whether the target is in FoV For example, when a direct signal path between an electronic device and the target device exists (such as under a LoS or in FoV scenario), SNRFirst and SNRMain are expected to be close and ToAGap is expected to be near-zero. In contrast, in NLoS or out-of-FoV cases, the first peak, representing the direct signal path, is likely to be of lower magnitude and far from the main peak, which represents the reflected signal path. Therefore, in the NLoS or out-of-FoV scenario SNRFirst is likely smaller than SNRMain and ToAGap is likely to be large. In the cases when the signal quality is bad, the first peak strength and the main peak are susceptible to drifting and likely to have smaller magnitude, thus the difference between SNRFirst and SNRMain, as well as the ToAGap can be a good indicator of whether the target device is in the FoV of the electronic device.

Other features that provide useful information for classifying FoV include RSSI, CIR features from different receiver antennas (AoA is normally estimated based on the phase difference from multiple antennas) including, but not limited to, SNRFirst, SNRMain and ToAGap. The aforementioned features correspond to an antenna of the device. If the measurement from multiple antennas for the features are present, each of those features can be obtained from either the same antenna or it can be a function of these CIR features obtained from different antennae. The antenna from which each of those features is used depends on the corresponding hardware characteristics as suitable for classification.

Variance of some of the features (such as variance of range, variance of the AoA, and variance of SNRFirst), over a certain sliding window also provide information that is useful for FoV classification. For example, if the window size is K, a buffer is maintained that stores previous K measurements of the features over which the variance is calculated and used in the feature vector. Instead of variance, other metrics that can measure the spread of the features can also be used.

In certain embodiments, SVM training involves finding a hyperplane in the N-dimensional feature space that can separate the data points in the two classes. For a data point $x_i$, if $y_i \in \{1, -1\}$ represents the corresponding label, with a positive label (a label with a value of one) representing FoV and a negative label (a label with a value of negative one) representing out-of-FoV. The optimization problem of SVM is defined as shown in Equation (13), such that Equations (14) and (15) are satisfied.

$$\min_{w,b,\xi} \frac{1}{2} w^T w + C \sum_i \xi_i \qquad (13)$$

$$y_i(w^T \phi(x_i) + b) \geq 1 - \xi_i, \text{ for all } i \qquad (14)$$

$$\xi_i \geq 0, \text{ for all } i \qquad (15)$$

Here, C>0 and represents the penalty on the error term and $\phi(x_i)$ is the projection of data point $x_i$ to a higher dimensional space.

One way of solving this minimization problem is by solving the following dual problem of Equation (16), such that Equations (17) and (18) are satisfied.

$$\max_{\lambda \geq 0} -\frac{1}{2} \sum_i \sum_j \lambda_i \lambda_j y_i y_j \phi(x_i)^T \phi(xj) + \sum_i \lambda_i \qquad (16)$$

$$\sum_i \lambda_i y_i = 0 \qquad (17)$$

$$0 \leq \lambda_i \leq C, \text{ for all } i \qquad (18)$$

A FoV classifier can output an FoV confidence, which is the probability of the target being in the positive class. For SVM, this probability is inversely proportional to the distance of the measurement from the hyperplane separating FoV and out-of-FoV.

Since the target device look up process, as described in the method of FIG. 6, involves recursive queries to different devices, thus it is possible that a device can be queried multiple times by different other devices, leading to additional processing loads and communication overheads. Accordingly, embodiments of the present disclosure describe procedures for removing and/or reducing these duplications.

In certain embodiments, at the step when the inquiring device asks the next environmental device to start its target device look up process, the inquiring device can also provide the environmental device with a list of devices that should be excluded from further inquiries, including the inquiring device and the inquiring device's set of environmental devices that satisfy bidirectional in-FoV condition. The environmental device can use this list of excluded devices to reduce the number of devices it would inquire further.

In other embodiments, once an environmental device finished its target device lookup process for a specific target device, it can store this result in its own memory for a certain amount of time, so that the next time it is queried again about the same target device, it can return this result immediately instead of repeating the target device lookup process. For example, when a new result from the target device lookup process is available, this result is saved as an entry into the memory of the environmental device with the following information: (i) the target device's MAC address (key), (ii) the current internal clock value of the environmental device as timestamp, and (iii) the estimated location of the target device with respect to the environmental device (value). The environmental device periodically checks its memory and calculate the difference between the current internal clock value with the timestamp of each entry. If the difference is large (based on a predefined threshold indicating that entry is too old), the environmental device will remove the entry from the memory. When a request came to this environmental device about a specific target device, the environmental device will scan its memory to see if an entry has the same MAC address as the requested target device. If so, it returns the stored values immediately. Otherwise, a new target device lookup process is started on this environmental device.

Figure 9A:
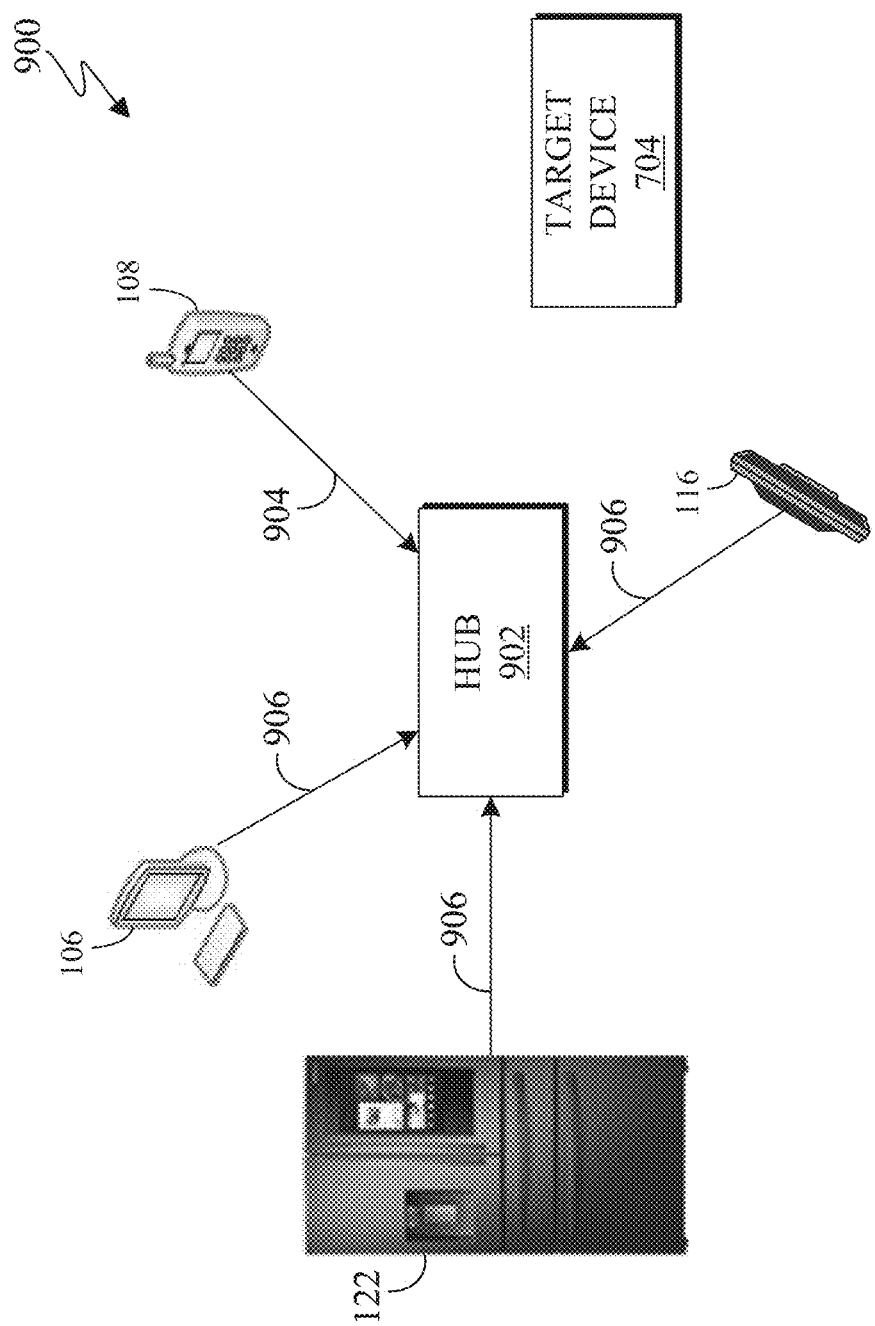
FIG. 9A illustrates an example environment of a user device locating a target device according to embodiments of the present disclosure.
Figure 9D:
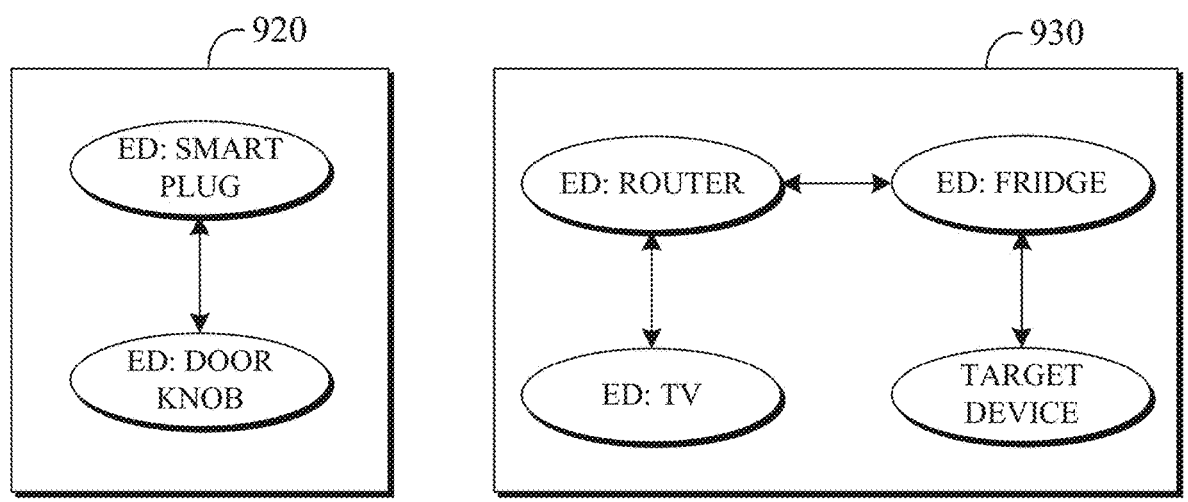
FIG. 9D illustrates an example graph plotting the location to the target device according to embodiments of the present disclosure.

FIGS. 9A-9D describe a centralized approach for localizing a target device. FIG. 9A illustrates an example environment 900 of a user device locating a target device according to embodiments of the present disclosure. FIG. 9B illustrates an example table 910a of environmental device locations according to embodiments of the present disclosure. FIG. 9C illustrates an example table 910b of a target device lookup map based on the example table of the environmental device locations of FIG. 9B according to embodiments of the present disclosure. FIG. 9D illustrates an example graphs 920 and 930 plotting the location to the target device according to embodiments of the present disclosure.

In certain embodiments, localizing a target device can be performed using a centralized localization approach. The environment 900 of FIG. 9A describes an example of the centralized approach for localizing a target device. In the centralized approach, a user device (such as the mobile device 108) identify the position of a target device 704 by querying a central home device, called hub 902, instead of querying one or more environmental devices. The hub 902 stores the complete map of the UWB ranging relationships between all pairs of environmental devices (such as the desktop computer 706, the television 116, and the refrigerator 115) that exist in the same environment. It is noted that the client devices that are included in the environment 900 are for illustration only and more or less client devices can be included in the environment 900.

The hub 902 is a device with storage capabilities, communication capabilities, and processing capabilities, such as a smart speaker, a dedicated computer, or a server. The communication capabilities of the hub 902 include, but not limited to, communicating with all environmental devices in different standard IoT protocols (such as Bluetooth, BLE, ANT+, and the like). The processing capabilities of the hub 902 include, but not limited to, determining in-FoV or not on behalf of environmental devices with low computation capabilities, running path finding algorithms (described below). The storage capabilities of the hub 902 include, but not limited to, storing all FoV and location results reported from environmental devices, or raw measurements sent from environmental devices with less processing capabilities.

In other embodiments, a cloud-based solution can be employed, in which the hub 902 can collect measurements and results from the environmental devices and send collected measurements to a cloud service, where more sophisticated algorithms are run, and the results are returned to the hub 902. The collaborative localization with the assistance of UWB enabled devices can be done in two main steps, that of a device registration step (step 1) and an online localization step (step 2). For example, the communications 906 between the various client devices (such as the desktop computer 106, the refrigerator 115, and the television 116) and the hub 902 represents the device registration step. The communication 904 between the mobile device 108 and the hub 902 represents an online localization.

It is noted that in the centralized localization approach, it is assumed that there is existing trust set up between the user device (such as the mobile device 108) and the hub 902 that allows the user device to be able to query the hub 902 in its process of locating the target device 704. In one example, the hub 902 (such as a smart speaker) and the user device (such as the mobile device 108) belongs to the same user.

This user can set up the user device to pair with the hub 902. Once the user device and the hub 902 are paired, the user, through the user device, can query the hub 902 about information from other environmental devices.

For another example, the hub 902, can be a dedicated server that serves multiple users (such as multiple members in the same household, or multiple employees in the same office) and each user device for each user is pre-registered with the hub 902. Only the user devices that are pre-registered would be allowed to request information of other environmental devices from the hub 902 for a target device localization process. This approach ensures a level of security and privacy to the environmental devices.

As described above, the centralized approach for localization can be done in two main steps, that of a device registration step (step 1) and an online localization step (step 2). In the first step (device registration) when a new device is installed, such as a new light bulb or a new smart plug, that device can register itself with the hub 902 to be added to an environmental device database. FIG. 9B illustrates the example table 910a showing a portion of an environmental device database.

The environmental device database keeps track of all the devices and their UWB ranging relationships. For example, when a new environmental device ($ED_n$) is introduced to the environment 900, the hub 902 provides the list of physical addresses (e.g., MAC addresses) of other existing environment devices in the same environment ($ED_1$, $ED_2$, ..., $ED_{n-1}$) to $ED_n$. Then the hub 902 requests that the $ED_n$ perform UWB ranging sessions with the existing devices. Thereafter, $ED_n$ then returns the UWB ranging results to the hub 902, and the hub 902 stores these results into its database (such as the environmental device database). The communication of the UWB ranging results to the hub 902 from the environment devices can be based on a standard out-of-band communication standard (such as standards specified by OCF, CHIP, or other standards organizations) that runs on top of different physical communication protocols (Bluetooth, ZigBee, and the like).

Each result can include the coordinates of one device (called destination device) with respect to the coordinate system of another device (called source device). For example, each of the UWB ranging results for $ED_n$ expresses the coordinates of $ED_1$, $ED_2$, ..., $ED_{n-1}$ with respect to the coordinate system of $ED_n$. These coordinates can be computed through the raw measurements (such as range, AoA azimuth and AoA elevation) obtained from the environmental devices. The ranging results to be stored in the environmental device database can be either no ranging results or with ranging results and the device coordinates are stored. In certain embodiments, these coordinates are computed by the range, the AoA azimuth and AoA elevation of the destination device as measured by two pairs of antennas placed orthogonally. The computation can either be done on the environmental device if it has enough computation capabilities or be done on the hub 902 with the raw measurements being sent from the environmental device to the hub 902.

The table 910a of FIG. 9B illustrates an example environmental device database where the cell value at row 'i' and column 'j' stores either no result, or the 3D coordinates of the device $ED_j$ with respect to the coordinate system of the $ED_i$, expressed as (xij, yij, zij). It is noted that it is possible for $ED_i$ to have ranging results to $ED_j$, but $ED_j$ has no ranging results to EDi, due to different FoVs of each device.

In the second step (online localization), when a user device wants to find the location of a target device, the user device will first attempt a direct UWB ranging session between the user device and the target device. If the ranging session is able to provide reliable UWB distance and AoA measurements, the results are generated. Alternatively, if the ranging session is unable to provide such reliable measurements, the user device (such as the mobile device 108) will send a query to the hub 902 to get the locations of target device 704 with respect to all the of the environmental devices (such as the desktop computer 106, the refrigerator 115, and the television 116).

The query that the user device sends to the hub 902 includes the physical address (e.g., MAC address) of the target device to the hub 902. In response to receiving the query The hub 902 starts a target device look up process with the help of the environmental devices. Then the hub 902, using the out-of-band channel, asks all of the environmental devices (such as the desktop computer 106, the refrigerator 115, and the television 116) to perform UWB ranging sessions to the target device 704 and report the results back to the hub 902. Upon receiving results, from one or more the of the environmental devices, the hub 902 will use its environmental database to create a new map, called target device lookup map, with the additional information about the target device positions. The table 910b of FIG. 9C illustrates an example target device lookup map. The hub 902 then uses this target device look up map to find the location of target device with respect to the coordinate system of each of the environmental devices.

In certain embodiments, the hub 902 constructs a graph where each node is a respective environmental device or the target device, and a connection between two pair of nodes is set when the two corresponding environmental devices satisfy the bidirectional in-range-FoV condition. Examples of this graph are illustrated in FIG. 9D.

The hub 902 can then perform a path finding algorithm on this graph to find the path from each environmental device to the target device. In case the information in the target device lookup map does not have associated confidence values, the graph connecting environmental devices and a target device is unweighted graph. For this unweighted graph, a common path finding algorithm for graphs is Breadth-First Search, which helps find the smallest number of devices between an environmental device denoted as '$ED_i$' and the target device. When the number of devices between EDi and the target device is not required to be smallest, Depth-First Search algorithm can be used for path finding as well. Once the path between EDi and the target device is found, the hub 902 can perform an operation (such as chain matrix multiplication) to obtain the location of the target device with respect to EDi's coordinate system. If such a path is not found, the hub 902 reports no result for EDi.

FIG. 9D illustrates an example graphs 920 and 930 plotting the location to the target device. The nodes in the graphs 920 and 930 are the target device and environmental devices including a smart plug, a doorknob, a router, a television, and a refrigerator. Each connection between two nodes show that the two devices on the two nodes satisfies the bidirectional in-range-FoV condition, e.g. The television is in range and in-FoV of the router, and the router is in range and in-FoV of the television. After running the path finding algorithm, the hub 902 identifies the following path results from an environmental device to the target device: (i) from smart plug, there is no path; (ii) from doorknob, there is no path; (iii) from television, the path is television—router—refrigerator—target device; (iv) from Router, the path is router—refrigerator—target device; and (v) from refrigerator, the path is refrigerator—target device. That is, the path as shown in the graph 920 indicates that no path is found while the path as shown in the graph 930 describes a pathway from a television to the target device via the router and the refrigerator.

In certain embodiments, after the hub 902 finishes all the path finding steps and calculations, the hub 902 sends back the results to the user device. It is noted that result is the location of the target device with respect to one of the environmental devices. As the user device moves, at each time step, the user device can identify a set of neighboring environmental devices that satisfy the bidirectional in-range-FoV condition. Since each result the user device has from an environmental device is the location of the target device with respect to that environmental devices, the user device can perform an operation such as matrix multiplication to obtain the target device location with respect to its own coordinate system. This result will then be saved into the user devices list of candidate target device locations. The user device then performs the result combination process. The final target device location can be the average of all the possible target device locations. Alternatively, when each result returned from an environmental device is associated with a confidence value, the final target device location can be the weighted average of all the possible target device locations with the confidence value as the weight for each component location.

Additionally, when the information in the target device lookup map is associated with confidence values, the graph connecting environmental devices and target device is directed weighted graph. For example, each pair of nodes have two edges in two directions, and each edge has a weight such that (i) the edge from node A to node B has the weight that equals to the confidence value of the coordinate of A with respect to B's coordinate system and (ii) the edge from node B to node A has the weight that equals to the confidence value of the coordinate of B with respect to A's coordinate system. For this weighted graph, the path finding from each EDi to the target device can be done based on an algorithm such as the Dijkstra algorithm, which can find the path between EDi to the target device with the highest total of confidence values in its path.

In certain embodiment, at each time step, the user device can send the hub 902 the set of environmental devices that satisfy the bidirectional in FoV condition, and the hub 902 will only return the results corresponding to the environmental devices that the user device requests. This limits the user device from seeing the identification of the environmental devices that it doesn't have UWB measurements to, such as when the network has privacy and security restrictions.

In certain embodiments, once the position of the target device with respect to the user device is obtained, the location of the target device can be displayed to the user. For example, the user device will display the camera view with overlaying information about where the target device is. The information can be in text (such as the "the target device is 10 m and 20 degrees to the right in front of you"). The information can be in interactive graphics (such as an arrow pointing to the target direction with associated distance). Other methods of displaying the location of the target device can be displayed on a display of the user device.

For another example, where an indoor map is available to the user device (such as in the case of user's house) and the absolute position of the user device in the indoor map is known, the user device will compute the absolute position of the target device in the indoor map. The user device then displays the indoor map and a marker of where the target device is in the map.

For yet another example, the position of the target device can be displayed to the user in an intuitive way. For instance some in the indoor environment include iconic appliances. Iconic appliances are appliances that most users know the locations in the indoor environment such as a refrigerator, TV, and the like. After the position of the target device with respect to the user device is obtained, the user device can determine if there are any iconic appliances that satisfy the bidirectional in-range-FoV condition. If such an iconic appliance is found, the user device can perform the coordinate translation to compute the target device position with respect to the iconic appliance. The user device then informs the user of the target device location with respect to the iconic appliance. For example, the user device display text or verbally speak text specifying that "the target device is three meters in front of the refrigerator."

In addition to the centralized and decentralized approaches described above, a hybrid approach can be implemented for localizing a target device. In the hybrid approach each device keeps its local list for the other devices it has FoV to (with location and timestamp). This can be done through a scheduled UWB discovery mechanism that the fixed device can perform periodically at certain predefined time intervals such as every 1 minute, every 1 hour, and the like. When the user device wants to find a target device, if there is no direct UWB measurements between them, the user device sends a look up request to the hub 902. The hub 902 will query the devices being registered with it. The devices that have target device among the devices they have seen will respond to the hub 902. The hub 902 then consolidates the target device location information and provides an answer to the find request of the user device. In certain embodiments, the hub 902 also provide a list of locations when the target device was last seen.

Moreover, in addition to the decentralized approach, the centralized approach, and the hybrid approach, described above, embodiments of the present disclosure also describe a collaborative localization approach for localizing a target device. FIGS. 10A-10D describe the collaborative localization approach.

Figure 10A:
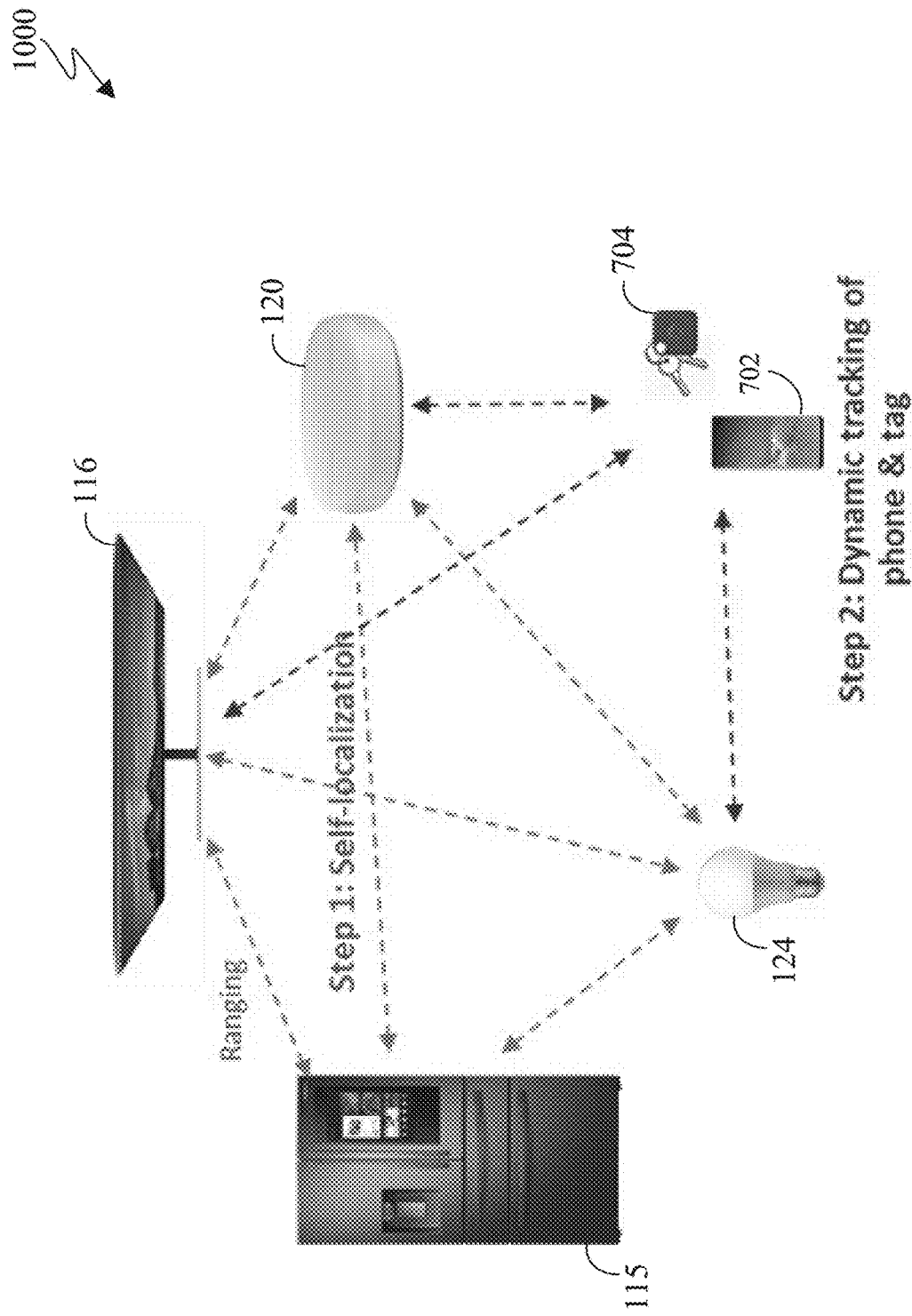
FIG. 10A illustrates an example environment of a user device locating a target device according to embodiments of the present disclosure.
Figure 10B:
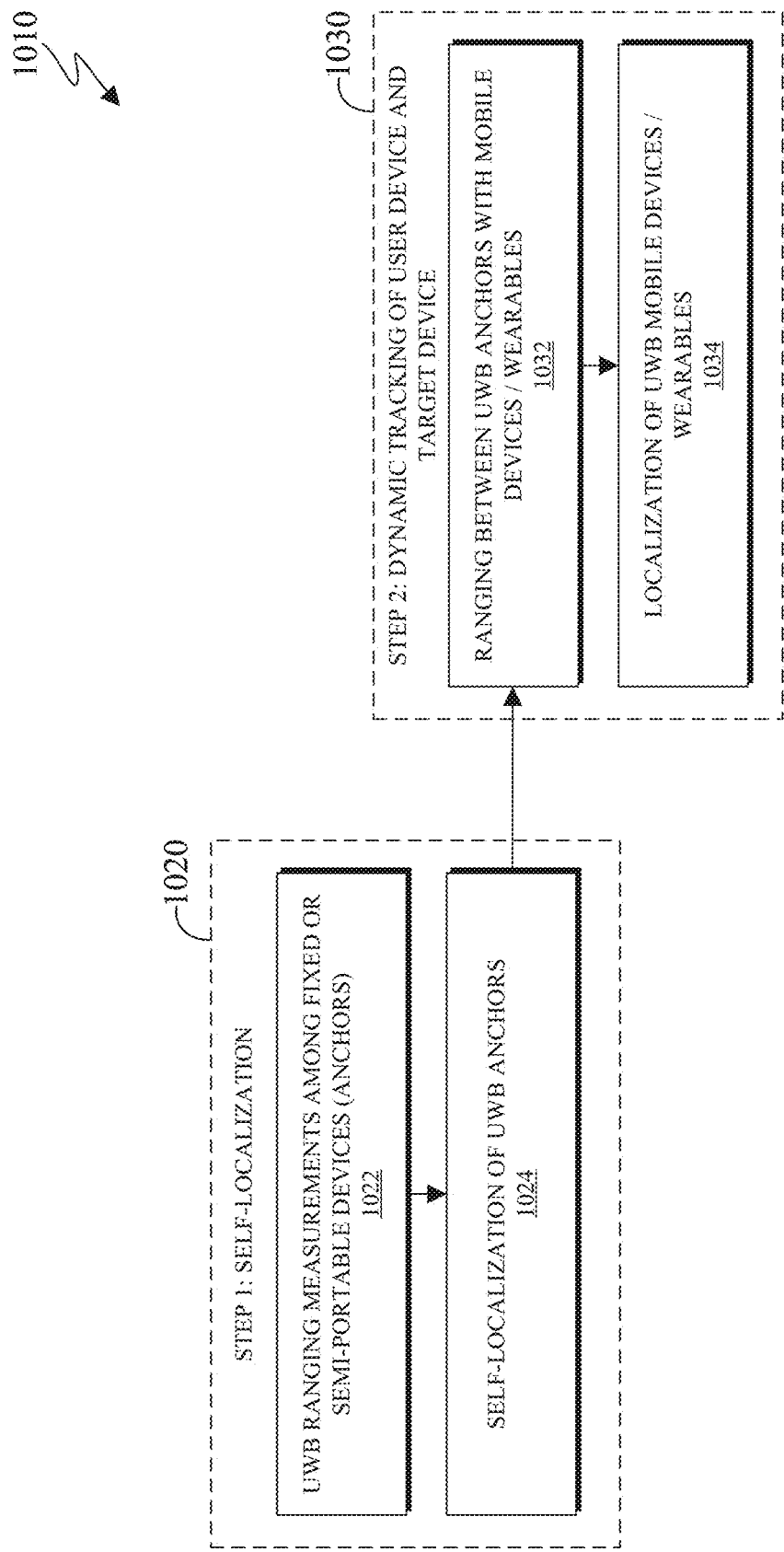
FIGS. 10B, 10C, and 10D illustrate example methods for determining a location of a target device according to embodiments of the present disclosure.
Figure 10C:
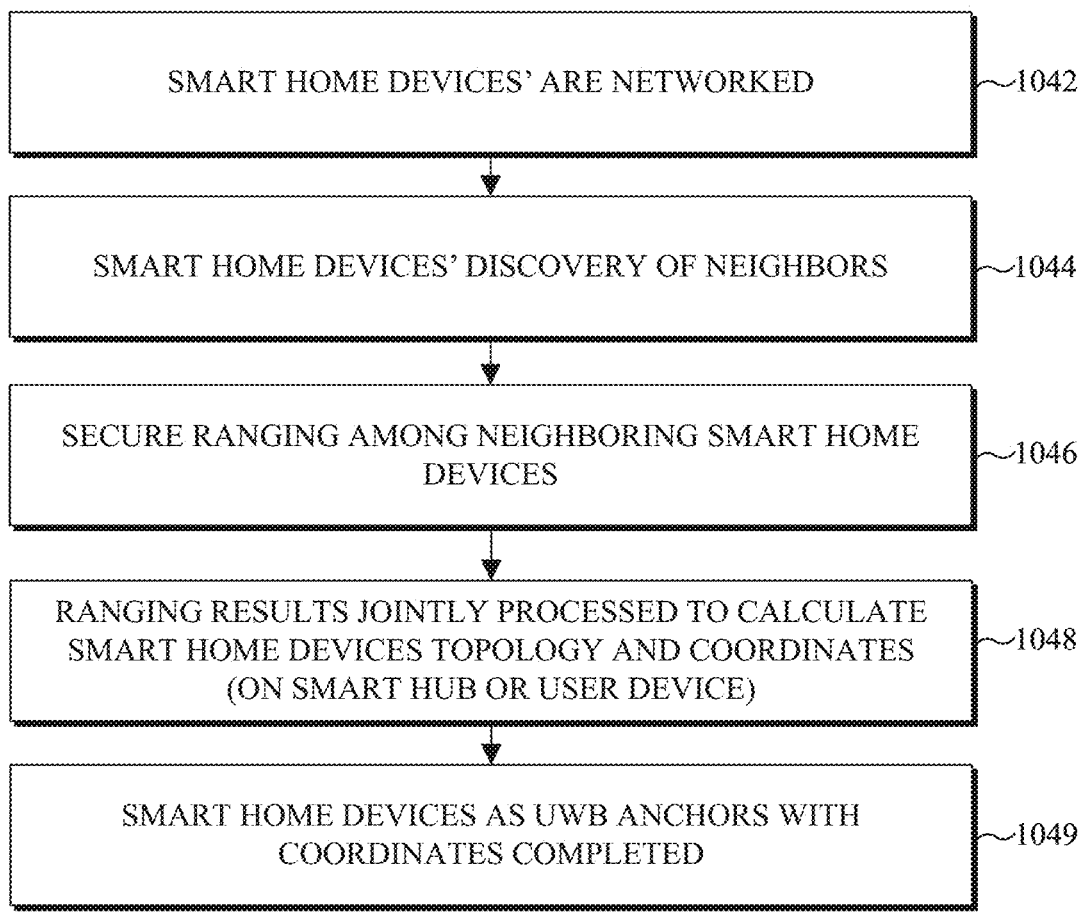
Figure 10D:
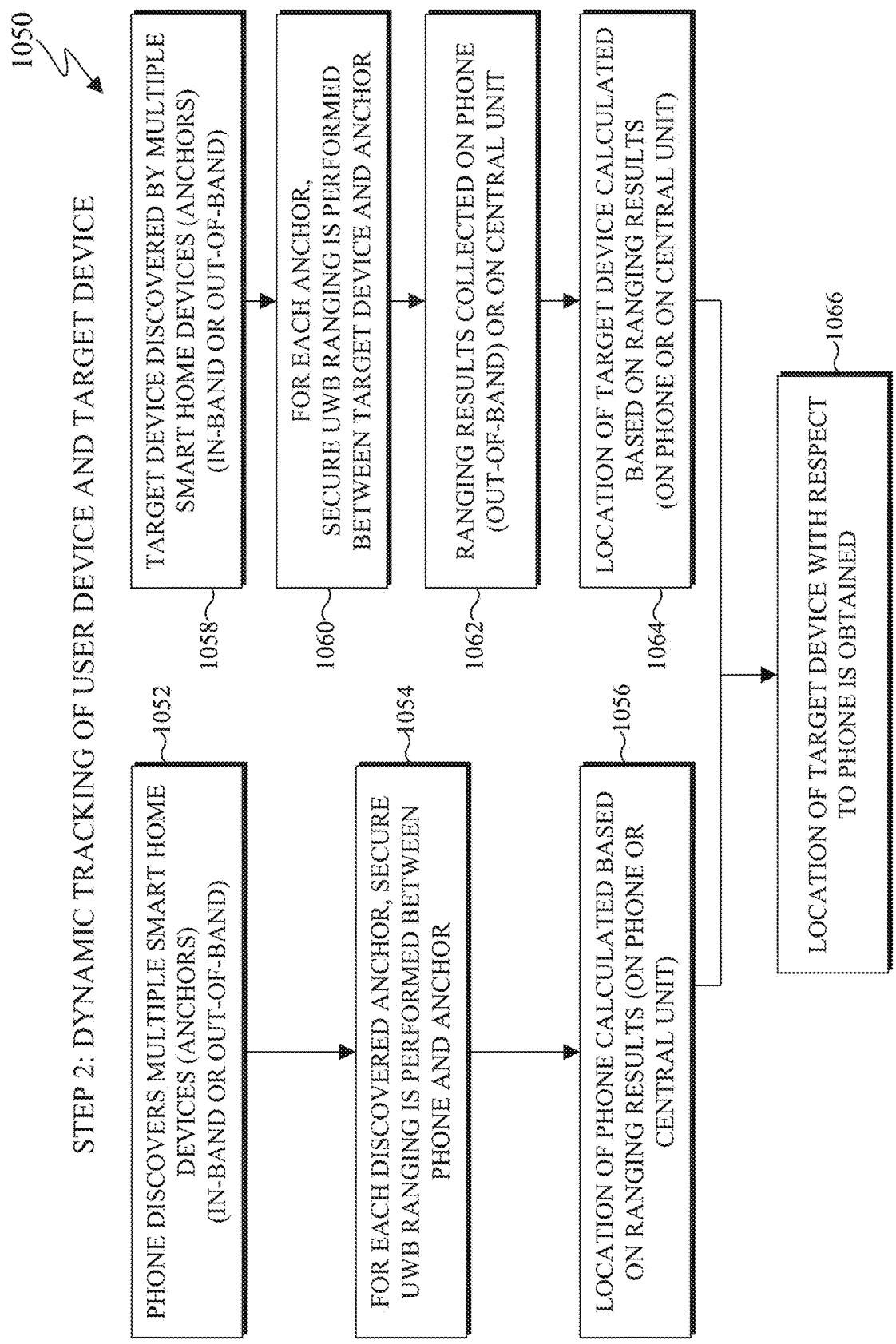

FIG. 10A illustrates an example environment 1000 of a user device locating a target device according to embodiments of the present disclosure. FIGS. 10B, 10C, and 10D illustrate example methods 1010, 1040, and 1050 for determining a location of a target device according to embodiments of the present disclosure.

The methods 1010, 1040, and 1050 are described as implemented by any one of the client device 106-116 of FIG. 1, the server 104 of FIG. 1, any of the electronic devices 502 of FIGS. 5A, 5B, and 5C, the hub 902 of FIG. 9A and can include internal components similar to that of electronic device 200 of FIG. 2 and the electronic device 301 of FIG. 3. However, the method 1010 as shown in FIG. 10B, the method 1040 as shown in FIG. 10C, and the method 1050 as shown in FIG. 10D, could be used with any other suitable electronic device and in any suitable system.

The collaborative localization approach includes a first step for self-localization and a second step for dynamic tracking. FIGS. 10A and 10B illustrate the two steps for the collaborative localization approach. For example, the environment 1000 of FIG. 10A shows the two steps of the collaborative localization approach. Similarly, the collaborative localization approach is described in the method 1010 of FIG. 10B.

The self-localization step 1020 (step 1) includes two sub steps, and the dynamic tracking step 1030 (step 2) includes two sub stems. Step 1022 of the self-localization step 1020 involves the smart home devices performing ranging with other smart home devices within range and then self-localization of the smart home devices. Self-localization corresponds to calculation or estimation of the location of each smart home device relative to other smart home devices. The self-location process can be done by collecting all pair-wise ranging measurement between devices into a global map in a dedicated device. Once this global map is obtained, step 1024 of the self-localization step 1020 is performed. In step 1024, the localization calculation is done on this device and shared with all other devices in participation. The smart home devices involved in this step can be either of fixed location or portable, such as door lock, refrigerator 115, television 116, light bulb 124, access point 120, and the like.

After the self-localization step 1020 (step 1) is performed, the smart home devices with the estimated location relative to each other are assumed to be anchors needed for the dynamic tracking step 1030 (step 2). For example, in FIG. 10A, after self-localization, the television 116, the refrigerator 115, the smart light bulb 124, and the router (the access point 120) can be used as anchors in step 2. In the 1032, ranging sessions between the anchors and devices such as user device 702, the target device 704, and other devices that need to be dynamically tracked are performed. In step 1034, the results of the ranging are used to estimate the locations of the tracked devices. In certain embodiments, multilateration techniques are used to estimate the locations of the tracked devices, In other embodiments, if angle information is available via AoA estimation, triangulation techniques are also used.

The method 1040 of FIG. 10C further describes the self-localization step 1020 of FIGS. 10A and 10B. In step 1042 the smart home devices are first networked. In certain embodiments, the network is a Wi-Fi network. In step 1044, each smart home device makes discovery of various other smart home devices (using an in-band or out-of-band, such as BLE). In step 1046, for each discovered smart home device, secure UWB ranging is done. In step 1048, ranging results of all smart home devices collected over Wi-Fi network and processed by a central unit (such as the hub 902) to calculate smart home devices' locations (topology). In certain embodiments, multidimensional scaling (MDS) is used to generate the ranging results. In step 1049, the smart home devices are considered UWB anchors. In certain embodiments, the locations' estimate can be updated periodically or by event-triggered (e.g. more devices are turned on, one or more of devices have been moved).

The method 1050 of FIG. 10D further describes the dynamic tracking step 1030 of FIGS. 10A and 10B. In step 1052, the phone discovers various smart home devices (anchors) (in-band or out-of-band, such as BLE). For each discovered smart home device, in step 1054 secure UWB ranging is done for phone and target device (can be with separate set of UWB anchors). In step 1056, the locations of the phone and the target device can be estimated separately with the ranging results, using range-based positioning techniques such as multilateration. The calculation for the location of the phone can be done by the phone or by the central unit (e.g. smart home hub).

In step 1058, the target device is also discovered by various smart home devices. For each discovered anchor, in step 1060 secure UWB ranging is performed between the target device and the anchor. In step 1062 ranging results are collected on the by the phone or by the central unit (such as the hub 902). In step 1064, the location of the target device is calculated based on the ranging results. The calculation for the location of the target device can be done by the phone or by the central unit (e.g. smart home hub).

In step 1066, phone can display the location of the target device relative to the phone and the other anchors, or it can display the location name label (e.g. "master bedroom" or "kitchen table"). It is noted that localization of the phone may not be necessary if the phone location is not needed for the user.

It is noted that the collaborative localization approach is different than the decentralized approach. For example, the collaborative localization approach uses pair-wise distance measurements between devices and AoA measurements are not needed. For instance, distance measurements between devices A and B can still be reasonably accurate when device A is out of FoV of device B. The Bidirectional in-FoV condition does not have to be satisfied in the collaborative localization approach. In the collaborative localization approach anchor locations are derived beforehand through self-localization process, which is not needed in decentralized approach. Additionally, in the collaborative localization approach, the position of the target device with respect to user device is derived from locations of the target device and the user device with respect to the coordinate system set up by the anchors. While in the decentralized approach, the position of the target device with respect to user device is calculated through multiple coordinate translations on the environmental devices along the path.

Although FIGS. 10B, 10C, and 10D illustrates example methods 1010, 1040, and 1050, various changes may be made to FIGS. 10B, 10C, and 10D. For example, while the methods 1010, 1040, and 1050 are shown as a series of steps, various steps could overlap, occur in parallel, occur in a different order, or occur multiple times. In another example, steps may be omitted or replaced by other steps.

Figure 11:
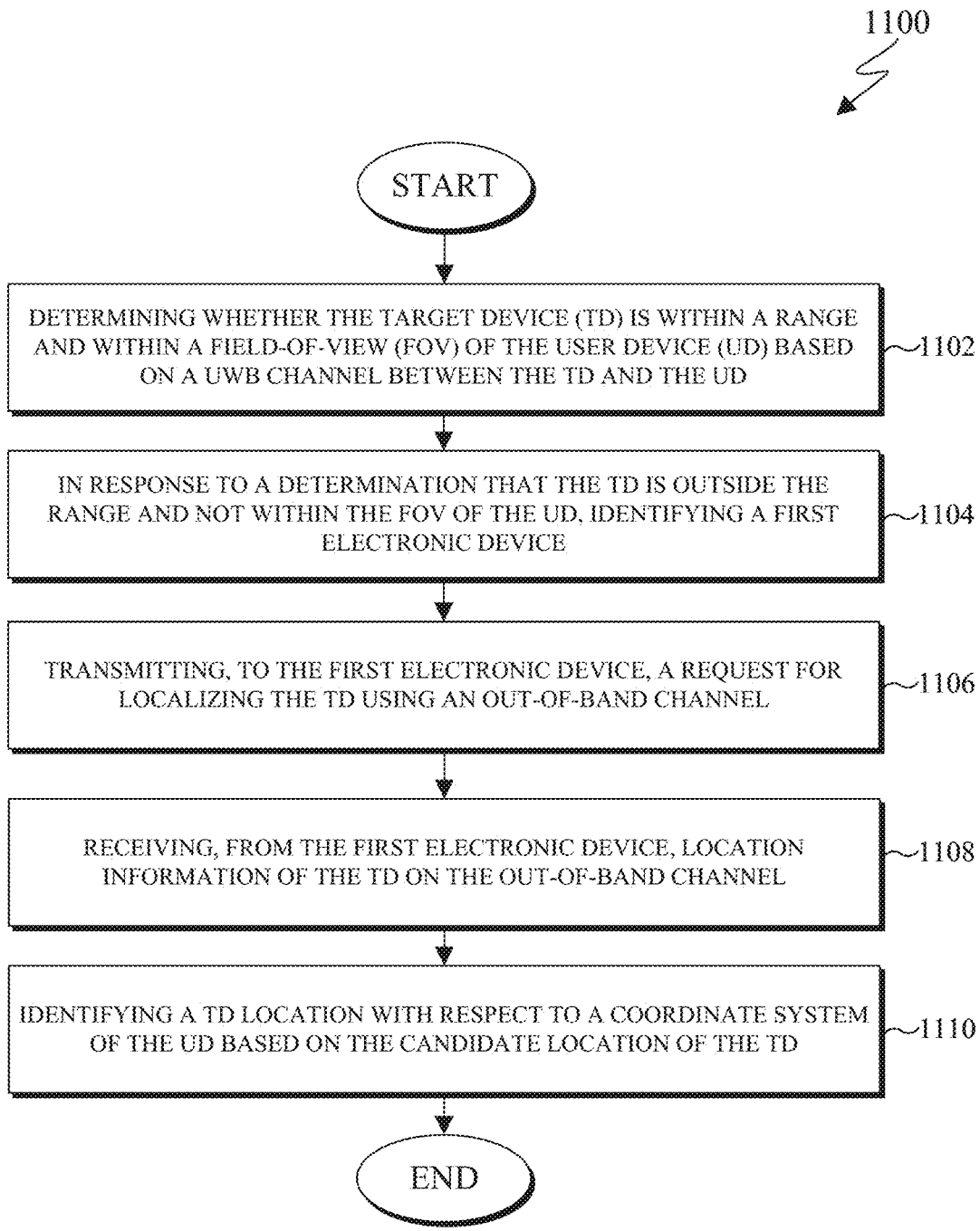
FIG. 11 illustrates an example method for determining a location of a target device according to embodiments of the present disclosure.

FIG. 11 illustrates an example method 1100 for determining a location of a target device according to embodiments of the present disclosure. The methods 1100 is described as implemented by any one of the client device 106-116 of FIG. 1, the server 104 of FIG. 1, any of the electronic devices 502 of FIGS. 5A, 5B, and 5C, the user device 702 of FIG. 7A, any of the electronic devices 712-719 of FIG. 7A, the hub 902 of FIG. 9A and can include internal components similar to that of electronic device 200 of FIG. 2 and the electronic device 301 of FIG. 3. However, the method 1100 as shown in FIG. 11 could be used with any other suitable electronic device and in any suitable system.

In step 1102 the user device 702 determines whether a target device is within a range and within FoV based on a UWB channel between the target device and the user device 702. If the user device determines that the target device is within a range and within FoV then the user device can determine the location of the target device.

In response to the user device determining that the target device is outside the range and not within FoV, the user device identifies a first electronic device (step 1104). In the decentralized approach the first electronic device is one or more environmental device. In the centralized approach the first electronic device is the centralized hub (such as the hub 902 of FIG. 9A).

In the decentralized approach the user device can determine whether the first electronic device (which represents one or more environmental device) is within a range and within a FoV. Upon determining that the first electronic device satisfies a Bidirectional in-FoV condition, the first electronic device is identified as an environmental device. The user device can identify multiple environmental devices.

In the centralized approach, the first electronic device (which is the centralized hub) can store a map of ranging relationships between pairs of environmental devices. the ranging relationships can be based on a UWB channel.

In step 1106, the user device transmits to the first electronic device (which can be either an environmental device or the centralized hub) a request for localizing the target device using an out-of-band channel. The out out-of-band channel is different than the UWB channel which is used for determining whether a device is in FoV and in range of the user device.

In the decentralized approach, the user device can identify two or more environmental devices (denoted as the first device and a second device). In this example, the user device can then transmit to both the first electronic device and the second electronic device requests for localizing the target device using an out-of-band channel. The transmitted request to the first electronic device includes an indication of the second electronic device. Similarly, the transmitted request to the second electronic device includes an indication of the first electronic device. By notifying each of the electronic devices about each other, enables the first electronic device to not search for the second electronic device, since each device is individually searching for the target device.

In step 1108, the user device receives location information of the target device from the first electronic device via the out-of-band channel. The location information can be a candidate location of the target device in a coordinate system of the first electronic device or another electronic device. In the centralized approach, the location information can be received from the centralized hub. Here, the location information can include a target device map based on the candidate locations of the target device that were received by the centralized hub.

In the decentralized approach, the location information can be received from one or more environmental devices (such as the first device and a second device). In this example, the user device can receive location information of the target device from the both the first electronic device and the second electronic device. That is (i) the location information that is received from the first electronic device identifies the location of the target device based on a coordinate system of the first electronic device and (ii) the location information that is received from the second electronic device identifies the location of the target device based on a coordinate system of the second electronic device.

In step 1110, the user device identifies the location of the target device with respect to its own coordinate system based on the received location information. For example, the user device transforms the received location information of the target device from one coordinate system to its own coordinate system. In the decentralized approach, the user device can combine multiple candidate locations (from two or more environmental devices) to generate the final location of the target device. To combine the multiple candidate locations the user device can average the locations together. Alternatively, to combine the multiple candidate locations the user device can perform a weighted average the locations together when the location information that is received from the environmental devices includes a confidence score associated with the location of the target device.

In certain embodiments, the user device generates information indicating the location of the target device based on a current location of the user device. The user device can then display on a display a view of the environment around the user device. The displayed view can be augmented with information indicating that location of the target device.

Although FIG. 11 illustrates the example method 1100, various changes may be made to FIG. 11. For example, while the method 1100 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for localizing a target device (TD) by an user device (UD), the method comprising:
   determining whether the TD is within a range and within a field-of-view (FoV) of the UD based on a UWB channel between the TD and the UD;
   in response to a determination that the TD is outside the range and not within the FoV of the UD, identifying a first electronic device;
   transmitting, to the first electronic device, a request for localizing the TD using an out-of-band channel, wherein the out-of-band channel is different from the UWB channel;
   receiving, from the first electronic device, location information of the TD on the out-of-band channel, the location information representing a candidate location of the TD in a coordinate system of the first electronic device or a second electronic device; and
   identifying a TD location with respect to a coordinate system of the UD based on the candidate location of the TD.

2. The method of claim 1, further comprising:
   determining that the first electronic device is within a range and within a FoV of the UD based on the UWB channel;
   determining that the UD is within a range and within a FoV of the first electronic device based on the UWB channel; and identifying the first electronic device as an environmental device.

3. The method of claim 2, wherein:
the environmental device is a first environmental device;
the location information is a first location information;
the candidate location of the TD is a first candidate location of the TD; and
the method further comprises:
- identifying a second environmental device based on a determination that the second environmental device satisfies a bidirectional FoV and range condition with the UD,
- receiving, from the second environmental device, second location information of the TD on the out-of-band channel, the second location information representing a second candidate location of the TD based on a coordinate system of the second environmental device, and
- identifying another TD location with respect to the coordinate system of the UD based on the second candidate location of the TD.

4. The method of claim 3, wherein:
identifying the TD location with respect to the coordinate system of the UD comprises identifying (i) a position of the UD relative to a position of the first environmental device and (ii) the position of the first environmental device relative to the position of the UD;
identifying the other TD location with respect to the coordinate system of the UD comprises identifying (i) the position of the UD relative to a position of the second environmental device and (ii) the position of the second environmental device relative to the position of the UD; and
the method further comprises generating a final location of the TD based at least on the TD location and the other TD location.

5. The method of claim 2, wherein:
the environmental device is a first environmental device; and
the method further comprises:
- identifying a second environmental device based on a determination that the second environmental device satisfies a bidirectional FoV and range condition with the UD,
- transmitting, to the first environmental device, the request for localizing the TD, wherein the request includes an indication of the second environmental device; and
- transmitting, to the second environmental device, a request for localizing the TD using the out-of-band channel, wherein the request includes an indication of the first environmental device.

6. The method of claim 1, wherein:
the first electronic device is a hub that stores a map of ranging relationships between pairs of environmental devices including the second electronic device, based on the UWB channel; and
the location information that is received from the hub includes a generated TD map based on the candidate location of the TD according to the second electronic device and a location of the second electronic device with respect to one or more of the pairs of environmental devices.

7. The method of claim 1, further comprising:
generating information indicating the TD location based on a current location of the UD; and
displaying on a display of the UD a view of an environment around the UD that is augmented with the information indicating the TD location.

8. A user device comprising:
a transceiver; and
a processor operably coupled with the transceiver and configured to:
- determine whether a target device (TD) is within a range and within a field-of-view (FoV) of the user device based on a UWB channel between the TD and the user device;
- in response to a determination that the TD is outside the range and not within the FoV of the user device, identify a first electronic device;
- transmit, to the first electronic device, a request for localizing the TD using an out-of-band channel, wherein the out-of-band channel is different from the UWB channel;
- receive, from the first electronic device, location information of the TD on the out-of-band channel, the location information representing a candidate location of the TD in a coordinate system of the first electronic device or a second electronic device; and
- identify a TD location with respect to a coordinate system of the user device based on the candidate location of the TD.

9. The user device of claim 8, wherein the processor is further configured to:
determine that the first electronic device is within a range and within a FoV of the user device based on the UWB channel;
determine that the user device is within a range and within a FoV of the first electronic device based on the UWB channel; and
identify the first electronic device as an environmental device.

10. The user device of claim 9, wherein:
the environmental device is a first environmental device;
the location information is a first location information;
the candidate location of the TD is a first candidate location of the TD; and
the processor is further configured to:
- identify a second environmental device based on a determination that the second environmental device satisfies a bidirectional FoV and range condition with the user device,
- receive, from the second environmental device, second location information of the TD on the out-of-band channel, the second location information representing a second candidate location of the TD based on a coordinate system of the second environmental device, and
- identify another TD location with respect to the coordinate system of the user device based on the second candidate location of the TD.

11. The user device of claim 10, wherein:
to identify the TD location with respect to the coordinate system of the user device, the processor is configured to identify (i) a position of the user device relative to a position of the first environmental device and (ii) the position of the first environmental device relative to the position of the user device;
to identify the other TD location with respect to the coordinate system of the user device, the processor is configured to identify (i) the position of the user device relative to a position of the second environmental device and (ii) the position of the second environmental device relative to the position of the user device; and the processor is further configured to generate a final location of the TD based at least on the TD location and the other TD location.

12. The user device of claim 9, wherein:

the environmental device is a first environmental device; and the processor is further configured to:

identify a second environmental device based on a determination that the second environmental device satisfies a bidirectional FoV and range condition with the user device, transmit, to the first environmental device, the request for localizing the TD, wherein the request includes an indication of the second environmental device; and transmit, to the second environmental device, a request for localizing the TD using the out-of-band channel, wherein the request includes an indication of the first environmental device.

13. The user device of claim 8, wherein:

the first electronic device is a hub that stores a map of ranging relationships between pairs of environmental devices including the second electronic device, based on the UWB channel; and the location information that is received from the hub includes a generated TD map based on the candidate location of the TD according to the second electronic device and a location of the second electronic device with respect to one or more of the pairs of environmental devices.

14. The user device of claim 8, wherein the processor is further configured to:

generate information indicating the TD location based on a current location of the user device; and display on a display of the user device a view of an environment around the user device that is augmented with the information indicating the TD location.

15. A non-transitory computer readable medium embodying a computer program, the computer program comprising computer readable program code that, when executed by a processor of a user device, causes the user device to:

determine whether a target device (TD) is within a range and within a field-of-view (FoV) of the user device based on a UWB channel between the TD and the user device;

in response to a determination that the TD is outside the range and not within the FoV of the user device, identify a first electronic device;

transmit, to the first electronic device, a request for localizing the TD using an out-of-band channel, wherein the out-of-band channel is different from the UWB channel;

receive, from the first electronic device, location information of the TD on the out-of-band channel, the location information representing a candidate location of the TD in a coordinate system of the first electronic device or a second electronic device; and identify a TD location with respect to a coordinate system of the user device based on the candidate location of the TD.

16. The non-transitory computer readable medium of claim 15, wherein the computer readable program code, when executed by the processor, further causes the user device to:

determine that the first electronic device is within a range and within a FoV of the user device based on the UWB channel;

determine that the user device is within a range and within a FoV of the first electronic device based on the UWB channel; and identify the first electronic device as an environmental device.

17. The non-transitory computer readable medium of claim 16, wherein:

the environmental device is a first environmental device;

the location information is a first location information;

the candidate location of the TD is a first candidate location of the TD; and the computer readable program code, when executed by the processor, further causes the user device to:

identify a second environmental device based on a determination that the second environmental device satisfies a bidirectional FoV and range condition with the user device, receive, from the second environmental device, second location information of the TD on the out-of-band channel, the second location information representing a second candidate location of the TD based on a coordinate system of the second environmental device, and identify another TD location with respect to the coordinate system of the user device based on the second candidate location of the TD.

18. The non-transitory computer readable medium of claim 17, wherein:

to identify the TD location with respect to the coordinate system of the user device the computer readable program code, when executed by the processor, further causes the user device to identify (i) a position of the user device relative to a position of the first environmental device and (ii) the position of the first environmental device relative to the position of the user device;

to identify the other TD location with respect to the coordinate system of the user device the computer readable program code, when executed by the processor, further causes the user device to identify (i) the position of the user device relative to a position of the second environmental device and (ii) the position of the second environmental device relative to the position of the user device; and the computer readable program code, when executed by the processor, further causes the user device to generate a final location of the TD based at least on the TD location and the other TD location.

19. The non-transitory computer readable medium of claim 16, wherein:

the environmental device is a first environmental device; and the computer readable program code, when executed by the processor, further causes the user device to:

identify a second environmental device based on a determination that the second environmental device satisfies a bidirectional FoV and range condition with the user device, transmit, to the first environmental device, the request for localizing the TD, wherein the request includes an indication of the second environmental device; and transmit, to the second environmental device, a request for localizing the TD using the out-of-band channel, wherein the request includes an indication of the first environmental device.

20. The non-transitory computer readable medium of claim 15, wherein:

the first electronic device is a hub that stores a map of ranging relationships between pairs of environmental devices including the second electronic device, based on the UWB channel; and the location information that is received from the hub includes a generated TD map based on the candidate location of the TD according to the second electronic device and a location of the second electronic device with respect to one or more of the pairs of environmental devices.

\* \* \* \* \*